US011813560B2

(12) United States Patent
Maletich et al.

(10) Patent No.: US 11,813,560 B2
(45) Date of Patent: Nov. 14, 2023

(54) AIR PURIFIER WITH INTELLIGENT SENSORS AND AIRFLOW

(71) Applicant: FELLOWES, INC., Itasca, IL (US)

(72) Inventors: Peter Maletich, Chicago, IL (US); Shawn Michael Applegate, Wood Dale, IL (US); Mitch Rydholm, Batavia, IL (US); Steven James Barnaby, Jr., Hanover Park, IL (US); Tai Hoon K. Matlin, Round Lake Beach, IL (US)

(73) Assignee: FELLOWES, INC., Itasca, IL (US)

( * ) Notice: Subject to any disclaimer, the term of this patent is extended or adjusted under 35 U.S.C. 154(b) by 134 days.

(21) Appl. No.: 15/833,581

(22) Filed: Dec. 6, 2017

(65) Prior Publication Data

US 2018/0154297 A1 Jun. 7, 2018

Related U.S. Application Data

(60) Provisional application No. 62/430,523, filed on Dec. 6, 2016.

(51) Int. Cl.
*B01D 46/00* (2022.01)
*B01D 46/44* (2006.01)
(Continued)

(52) U.S. Cl.
CPC ........... *B01D 46/442* (2013.01); *B01D 46/12* (2013.01); *B01D 53/047* (2013.01); *F24F 8/10* (2021.01);
(Continued)

(58) Field of Classification Search
CPC ...... B01D 46/00; B01D 46/442; B01D 46/12; B01D 2201/52; F24F 11/39; F24F 3/16;
(Continued)

(56) References Cited

U.S. PATENT DOCUMENTS 4,604,111 A * 8/1986 Natale ................ B01D 46/0024
160/332
5,324,344 A * 6/1994 Broyan ................ B01D 46/442
73/28.01
(Continued)

FOREIGN PATENT DOCUMENTS

CN         1994522 A      7/2007
CN       103912964 A   *  7/2014
(Continued)

OTHER PUBLICATIONS

International Preliminary Report on Patentability dated May 31, 2019 in International Application PCT/US2017/064919.
(Continued)

*Primary Examiner* — T. Bennett McKenzie
(74) *Attorney, Agent, or Firm* — Pillsbury Winthrop Shaw Pittman, LLP

(57) ABSTRACT

An air purifying system includes an air purifier mechanism, a controller, and a sensing device. The sensing device is configured to measure an air quality parameter of the air entering the housing via the air inlet to generate inlet air quality data, and to measure an air quality parameter of the purified air exiting the housing via the air outlet to generate outlet air quality data. The controller is configured to: receive the inlet air quality data and the outlet air quality data, compare the inlet air quality data and the outlet air quality data with their corresponding predetermined threshold ranges, and determine an action to be taken.

10 Claims, 13 Drawing Sheets

(51) Int. Cl.
| | |
|---|---|
| *B01D 53/047* | (2006.01) |
| *B01D 46/12* | (2022.01) |
| *F24F 11/39* | (2018.01) |
| *F24F 8/10* | (2021.01) |
| *F24F 8/108* | (2021.01) |
| *F24F 8/30* | (2021.01) |
| *F24F 8/158* | (2021.01) |
| *F24F 8/22* | (2021.01) |
| *F24F 110/50* | (2018.01) |
| *F24F 110/64* | (2018.01) |
| *F24F 110/62* | (2018.01) |
| *F24F 110/60* | (2018.01) |
| *F24F 110/66* | (2018.01) |

(52) U.S. Cl.
CPC .............. *F24F 8/108* (2021.01); *F24F 8/158* (2021.01); *F24F 8/22* (2021.01); *F24F 8/30* (2021.01); *F24F 11/39* (2018.01); *B01D 46/009* (2013.01); *F24F 2110/50* (2018.01); *F24F 2110/60* (2018.01); *F24F 2110/62* (2018.01); *F24F 2110/64* (2018.01); *F24F 2110/66* (2018.01)

(58) Field of Classification Search
CPC .. F24F 3/1603; F24F 2110/64; F24F 2110/50; F24F 2110/66; F24F 2110/60; F24F 2110/62
USPC ...................... 95/1–24; 55/282–305
See application file for complete search history.

(56) References Cited

U.S. PATENT DOCUMENTS

| | | | | |
|---|---|---|---|---|
| 5,325,707 A | * | 7/1994 | Slater | B01D 46/0086 73/38 |
| 5,554,416 A | * | 9/1996 | Scheufler | B01D 50/00 427/378 |
| 5,572,327 A | * | 11/1996 | Plinke | G01M 3/38 96/417 |
| 6,660,070 B2 | * | 12/2003 | Chung | B01D 46/46 96/424 |
| 2004/0256328 A1 | * | 12/2004 | Jornitz | B01D 46/442 96/417 |
| 2007/0084339 A1 | * | 4/2007 | Grant | B01D 46/46 95/1 |
| 2007/0105494 A1 | | 5/2007 | Lin | |
| 2007/0181000 A1 | * | 8/2007 | Wilson | A61L 9/014 96/134 |
| 2008/0257149 A1 | * | 10/2008 | Ogale | B03C 3/30 95/70 |
| 2010/0125367 A1 | * | 5/2010 | Burton | F24F 11/30 700/276 |
| 2011/0187123 A1 | | 8/2011 | Hamm et al. | |
| 2012/0111190 A1 | * | 5/2012 | Dariavach | B01D 46/429 95/10 |
| 2012/0125592 A1 | * | 5/2012 | Fadell | B01D 46/0086 96/417 |
| 2012/0318137 A1 | * | 12/2012 | Ragland | B01D 46/42 95/25 |
| 2014/0102296 A1 | * | 4/2014 | Pendergrass | F24F 11/0008 95/10 |
| 2015/0153317 A1 | | 6/2015 | Krebs | |
| 2015/0316285 A1 | | 11/2015 | Clifton et al. | |
| 2016/0153884 A1 | * | 6/2016 | Han | G01N 1/2205 73/1.06 |
| 2017/0074536 A1 | * | 3/2017 | Bentz | G06F 3/0488 |
| 2018/0221805 A1 | * | 8/2018 | Bae | B01D 46/58 |

FOREIGN PATENT DOCUMENTS

| | | | | |
|---|---|---|---|---|
| CN | 103912964 A | | 7/2014 | |
| CN | 205747334 U | | 11/2016 | |
| EP | 1102013 A2 | | 5/2001 | |
| WO | 2012066453 A1 | | 5/2012 | |
| WO | WO-2016096786 A1 | * | 6/2016 | ......... B01D 46/0086 |

OTHER PUBLICATIONS

Invitation to Pay Additional Fees and, Where Applicable, Protest Fee issued by the International Searching Authority in related PCT Application No. PCT/US2017/064919 dated Mar. 13, 2018, 16 pages.
International Search Report and Written Opinion dated Nov. 8, 2018 in International Application PCT/US2017/064919.
Written Opinion dated Mar. 13, 2019 in International Application PCT/US2017/064919.
Office Action dated Jun. 18, 2020 in Chinese Application 201780075246.7.
Office Action dated Jul. 6, 2021 in Chinese Application 201780075246.7.
Office Action dated Dec. 23, 2020 in European Application 17829376.7.
Office Action dated Mar. 24, 2021 in Chinese Application 201780075246.7.
Office Action issued in Chinese Application 202111195371.6, dated Jul. 29, 2022, with English machine translation.
"Wiring 1 thermostat to control 2 HVAC units (1 a heat pump!)," Sep. 2015, https://forum.heatinghelp.com/discussion/155291/wiring-1-thermostat-to-control-2-hvac-units-1-a-heat-pump. (Year: 2015).
Non-Final Office Action issued in U.S. Appl. No. 18/085,894, dated Apr. 26, 2023.

* cited by examiner

1. HEPA FILTER ASSEMBLY

2. ADD DOUBLE SIDED TAPE TO ENTIRE TOP (NOT SHOWN)

3. ADD SPACER TO TOP (USE FIXTURE TO ALIGN PROPERLY)

4. ADD MAGNET(S). (STANDARD HEPA TO USE ONLY 1 MAGNET.)

5. ADD LABEL (STICKER) TO RETAIN MAGNETS.
COULD HAVE INSPECTION NOTE & OR TECHNOLOGY BRANDING

NOTE:
ALL 3 MAGNET POSITIONS SHOWN.
STANDARD HEPA WILL ONLY HAVE 1.

AIR PURIFIER WITH INTELLIGENT SENSORS AND AIRFLOW

CROSS-REFERENCE TO PRIOR APPLICATION

This application claims benefit to U.S. Patent Application 62/430,523 filed Dec. 6, 2016, the contents of which are incorporated herein in their entirety.

BACKGROUND

Field

The present patent application relates to air purifiers. Specifically, the present patent application relates to an air purifying system having sensors and a controller to monitor and control the operation of the air purifying system.

Description of Related Art

Airborne dust and allergens such as pollen, mold spores, pet dander, and micro-organisms (e.g., germs and bacteria) may affect the health of persons breathing the air. Air purifiers are known devices that are used in interior spaces such as homes and commercial public spaces for providing fresh air by removing odors, dust, allergens and other airborne pollutants from the interior air.

The air purifier generally includes a housing with an air inlet and an air outlet. The air inlet is configured to receive ambient air and the air outlet is configured to deliver purified air into the interior space. The housing provides an airflow path from the air inlet to the air outlet. The housing also includes an air filtering system, a fan and a drive mechanism. The air filtering system is provided in the airflow path for filtrating contaminants present in ambient air passing therethrough. The fan is configured to move the air through the airflow path between the air inlet and the air outlet. The drive mechanism (e.g., a motor) is configured to provide power to draw air into the air inlet, to draw air through the airflow path and to exhaust purified air out of the air outlet.

The present patent application endeavors to provide various improvements over known air purifying systems.

BRIEF SUMMARY

In one embodiment of the present patent application, an air purifying system is provided. The air purifying system comprises an air purifier mechanism received in a housing, a sensing device, and a controller. The housing provides an airflow path between an air inlet configured to receive ambient air and an air outlet configured to deliver purified air. The air purifier mechanism includes an air purifying sub-system, a fan and a drive mechanism. The air purifying sub-system is disposed in the airflow path between the air inlet and the air outlet and is configured to remove contaminants present in the ambient air passing through the housing. The drive mechanism is configured to drive the fan to move the air through the airflow path between the air inlet and air outlet. The sensing device is disposed in or on the housing of the air purifying system. The sensing device is configured to measure an air quality parameter of the air entering the housing via the air inlet to generate inlet air quality data, and to measure an air quality parameter of the purified air exiting the housing via the air outlet to generate outlet air quality data. The controller is configured to: receive the inlet air quality data and the outlet air quality data, compare the inlet air quality data and the outlet air quality data with their corresponding predetermined threshold ranges, and determine an action to be taken based on the comparison.

In another embodiment of the present patent application, an air purifying system is provided. The air purifying system includes an air purifier mechanism and a sensor system. The air purifier mechanism is received in a housing that provides an airflow path between an air inlet configured to receive ambient air and an air outlet configured to deliver purified air. The air purifier mechanism includes an air purifying sub-system, a fan and a drive mechanism. The air purifying sub-system is disposed in the airflow path between the air inlet and the air outlet and is configured to remove contaminants present in the ambient air passing through the housing. The drive mechanism is configured to drive the fan to move the air through the airflow path between the air inlet and air outlet. The sensor system is disposed in the housing of the air purifying system. The sensor system includes a sensor housing, a flow directing member and a sensor device. The sensor housing has a first air inlet opening in fluid communication with a first portion of the airflow path, a second air inlet opening in fluid communication a second portion of the airflow path, and a suction opening. The flow directing member is disposed in the sensor housing and configured to be moved between a first position in which the flow directing member allows the air from the first portion of the airflow path to enter the sensor housing via the first air inlet opening and a second position in which the flow directing member allows the air from the second portion of the airflow path to enter the sensor housing via the second air inlet opening. The sensor device is disposed in the sensor housing and configured to measure an air quality parameter of the air entering the sensor housing. The fan is configured to be in fluid communication with the suction opening and configured to move the air entering the sensor housing through the sensor device.

In yet another embodiment of the present patent application, an air purifying system is provided. The air purifying system comprises an air purifier mechanism received in a housing, a user interface, and a controller. The housing provides an airflow path between an air inlet configured to receive ambient air and an air outlet configured to deliver purified air. The air purifier mechanism includes an air purifying sub-system, a fan and a drive mechanism. The air purifying sub-system is disposed in the airflow path between the air inlet and the air outlet and is configured to remove contaminants present in the ambient air passing through the housing. The drive mechanism is configured to drive the fan to move the air through the airflow path between the air inlet and air outlet. The user interface is operatively connected to the air purifying system to control the operation of the air purifying system. The user interface is positioned at a remote location from the air purifying system. The user interface includes a sensor device configured to measure an air quality parameter of the ambient air in a predetermined area proximate the user interface to generate surrounding air quality data. The controller is configured to operate the air purifying system based on the generated surrounding air quality data to ensure the air quality of the ambient air in the predetermined area proximate the user interface is within a predetermined level. In yet another embodiment of the present patent application, an air purifying system is provided. The air purifying system comprises an air purifier mechanism received in a housing. The housing provides an airflow path between an air inlet configured to receive ambient air and an air outlet configured to deliver purified air. The air purifier mechanism includes an air purifying sub-system, a fan and a drive mechanism. The air purifying sub-system is removably disposed in the airflow path between the air inlet and the air outlet and is configured to remove contaminants present in the ambient air passing through the housing. The drive mechanism includes a motor in communication with a sensor and a controller. The drive mechanism is configured to drive the fan at least one predetermined speed to move the air through the airflow path between the air inlet and air outlet. The sensor is configured to sense the current drawn by the motor and produce data related to motor current. The controller is configured to receive the motor current-related data and compare the motor current-related data with its corresponding predetermined threshold. The controller, based on the comparison of the motor current-related data with its corresponding predetermined threshold, is configured to determine that one or more components of the air purifying system are not functioning in accordance with a predetermined criteria.

In yet another embodiment of the present patent application, an air purifying device is provided. The air purifying device comprises an air purifier mechanism, a controller and a sensor. The air purifier mechanism is received in a housing. The housing provides an air flow path between an air inlet configured to receive ambient air and an air outlet configured to deliver purified air. The air purifier mechanism includes an air purifying system, a fan and a drive mechanism. The air purifying system is disposed in the air flow path and is configured to remove contaminants present in the ambient air passing through the housing. The drive mechanism is configured to drive the fan at variable speeds to move the air through the air flow path between the air inlet and air outlet. The controller has a plurality of predetermined operational settings to govern operation of the air purifier mechanism. The controller comprises one or more processors and is configured to receive an input to select one of the predetermined operational settings to govern the operation of the air purifier mechanism. The air purifier mechanism is configured to operate in at least one of a plurality of modes of operation for each of the air purifier mechanism's predetermined operational settings. The air purifying system is configured to removably receive at least one of a plurality of different types of air purifying components. The sensor is configured to detect the type of air purifying component received in the air purifying system from among the plurality thereof. The controller is configured to select the mode of operation from the plurality of modes of operation of the air purifier mechanism in response to the detected type of air purifying component detected by the sensor.

Other aspects, features, and advantages of the present patent application will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE DRAWINGS

Figure 1:
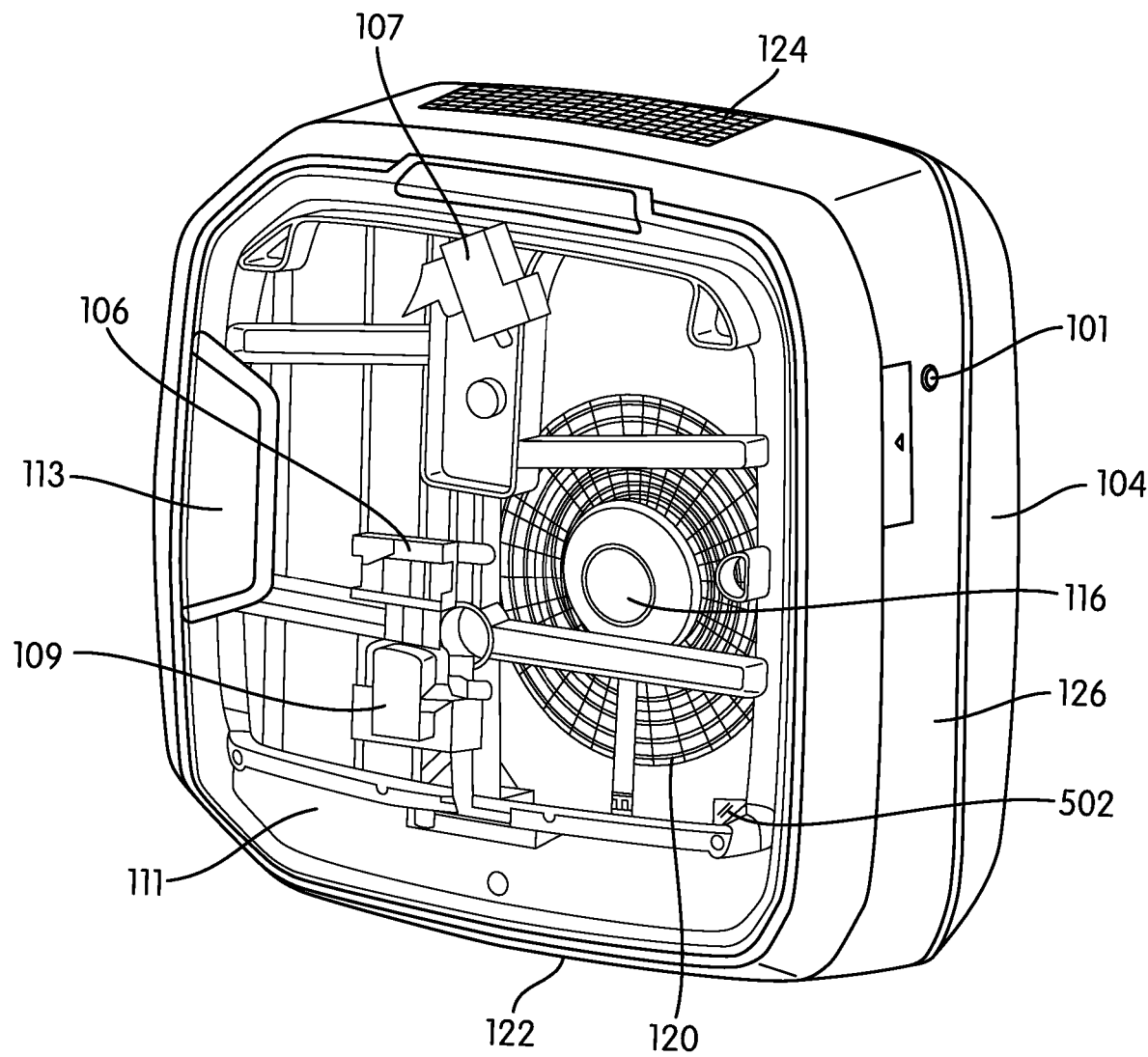
FIG. 1 shows an exemplary air purifying system in accordance with an embodiment of the present patent application.
Figure 2:
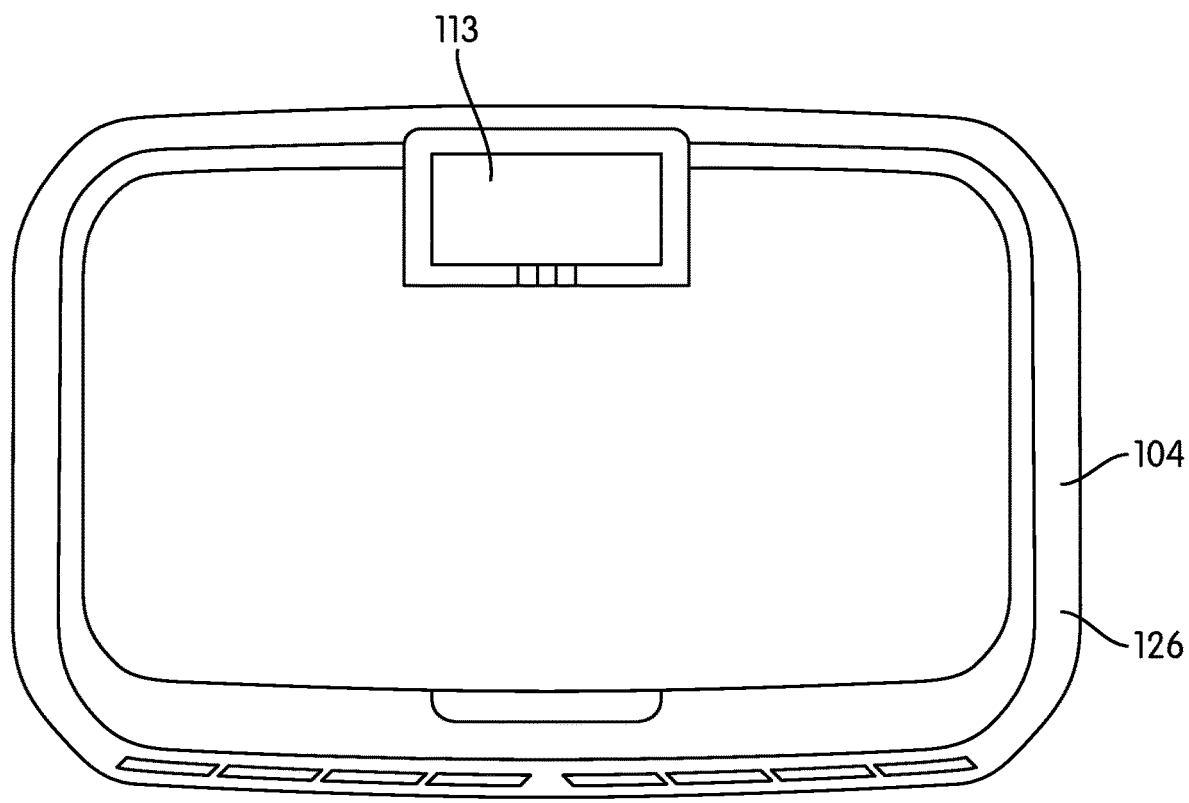
FIG. 2 shows another exemplary air purifying system in accordance with an embodiment of the present patent application.
Figure 3:
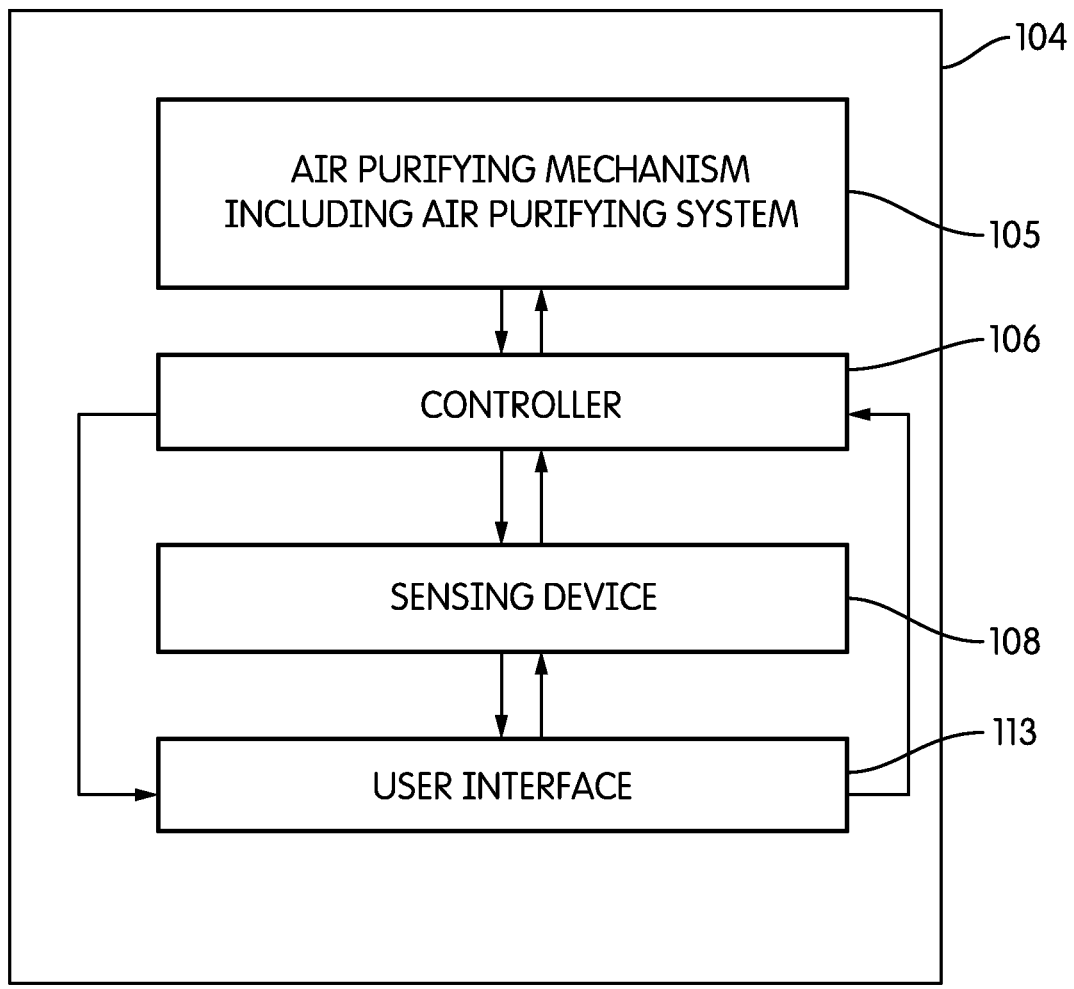
FIG. 3 shows a block diagram of an exemplary air purifying system in accordance with an embodiment of the present patent application.
Figure 9:
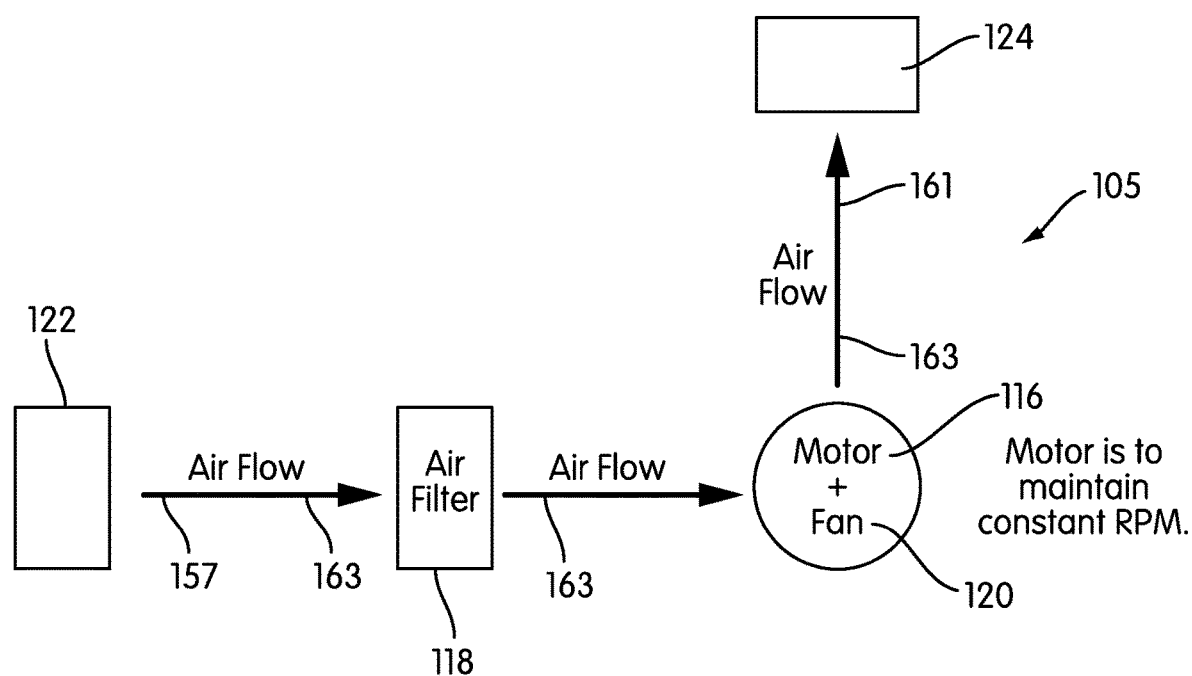
FIG. 9 shows a block diagram of an air purifier mechanism of the air purifying system in accordance with an embodiment of the present patent application.

Referring to FIGS. 1-3, the present patent application provides an air purifying system 104. The air purifying system 104 comprises an air purifier mechanism 105 received in a housing 126, a controller 106, and a sensing device 108. The housing 126 provides an airflow path 163 (as shown in FIG. 9) between an air inlet 122 configured to receive ambient air and an air outlet 124 configured to deliver purified air. The air purifier mechanism 105 includes an air purifying sub-system 118, a fan 120 and a drive mechanism 116. The air purifying sub-system 118 is disposed in the airflow path 163 between the air inlet 122 and the air outlet 124 and is configured to remove contaminants present in the ambient air passing through the housing 126.

The drive mechanism 116 is configured to drive the fan 120 at variable speeds to move the air through the airflow path 163 between the air inlet 122 and air outlet 124. The sensing device 108 is disposed in or on the housing 126 of the air purifying system 104. The sensing device 108 is configured to measure an air quality parameter of the air entering the housing 126 via the air inlet 122 to generate inlet air quality data, and to measure an air quality parameter of the purified air exiting the housing 126 via the air outlet 124 to generate outlet air quality data. The controller 106 is configured to: receive the inlet air quality data and the outlet air quality data, compare the inlet air quality data and the outlet air quality data with their corresponding predetermined threshold ranges, and determine an action to be taken based on the comparison.

In some embodiments, the action to be taken by the controller 106 may include removal and replacement of the filter element(s)/component(s) or purifying component(s)/element(s) of the air purifying system 104, removal and servicing/maintenance/repair of the filter element(s)/component(s) or purifying component(s)/element(s) of the air purifying system 104, removal and correct/proper installation of the filter element(s)/component(s) or purifying component(s)/element(s) of the air purifying system 104, and/or removal and correct/proper insertion of the filter element(s)/component(s) or purifying component(s)/element(s) of the air purifying system 104, removal.

In some embodiments, the action to be taken by the controller 106 may include removal and servicing/maintenance/repair of a fan motor, the fan 120, the drive mechanism 116 (including the motor) and/or any other components of the air purifier mechanism and/or air purifying system 104, and/or removal and replacement of a fan motor, the fan 120, the drive mechanism 116 (including the motor) and/or any other components of the air purifier mechanism and/or air purifying system 104.

In one embodiment, the controller 106 is configured to determine, based on the comparison of the inlet air quality data and the outlet air quality data with their corresponding predetermined threshold ranges, that one or more components of the air purifying system are not functioning in accordance with a predetermined criteria.

The air purifying system 104 is configured to be positioned or installed in a targeted zone. The targeted zone, herein, may be to a defined closed space or a defined semi-closed space. For example, the targeted zone may include public areas with an enclosed environment such as restrooms, schools, healthcare facilities, industrial spaces, office spaces, break rooms, cafeterias, warehouses, common rooms, other commercial spaces (e.g., restaurants, hotels, entertainment lounges), etc. The targeted zone may also be a sub-section of a larger space, such as a set of office cubicles or like.

The air quality parameter may include information related to air quality in the targeted zone. For example, the air quality parameter may include information related to dust, allergens (pollen, animal/pet dander or mold), particulate matters (bacteria or virus), pollutants, odors, smoke, temperature, humidity, volatile organic compounds (from sources such as paints, and other solvents, aerosol sprays, cleansers and disinfectants, air fresheners, stored fuels and automotive products and hobby supplies) and/or other air quality related parameters in the targeted zone.

The housing 126 of the air purifying system 104 may have a generally square, oblong or rectangular shape or configuration, or any other configuration. The air purifying system 104 has a width dimension that may generally range from about 7.00 inches to about 37.9 inches, a height dimension that may generally range from about 17.5 inches to about 25.00 inches, and a depth or thickness dimension that may generally range from about 6.38 inches to about 8.8 inches. In one embodiment, the air purifying system 104 has a width or thickness dimension that may generally be about 34.45 inches, a height dimension that may generally be about 21.65 inches, and a depth dimension that may generally be about 7.99 inches. In another embodiment, the air purifying system 104 has a width or thickness dimension that may generally be about 19.6 inches, a height dimension that may generally be about 20.9 inches, and a depth dimension that may generally be about 9.00 inches. However, it is contemplated that the air purifying system 104 may have other sizes, shapes or configurations that would be appreciated by a person skilled in the art. The air purifying system 104 may generally weigh from about 9.2 pounds to about 38 pounds. In one embodiment, the air purifier 104 may generally weigh about 20 pounds.

The housing 126 may be formed from a suitable molded plastic material. The housing 126 may be formed from sheet metal material or aluminum material. The housing 126 may be formed from a combination of a plastic material and a metal material. The air purifying system 104 may also include a security or vandal resistant lock 101 on a hinged door or filter access panel so as to resist attempts by thieves to gain access to internal compartments of the air purifying system 104.

Figure 6:
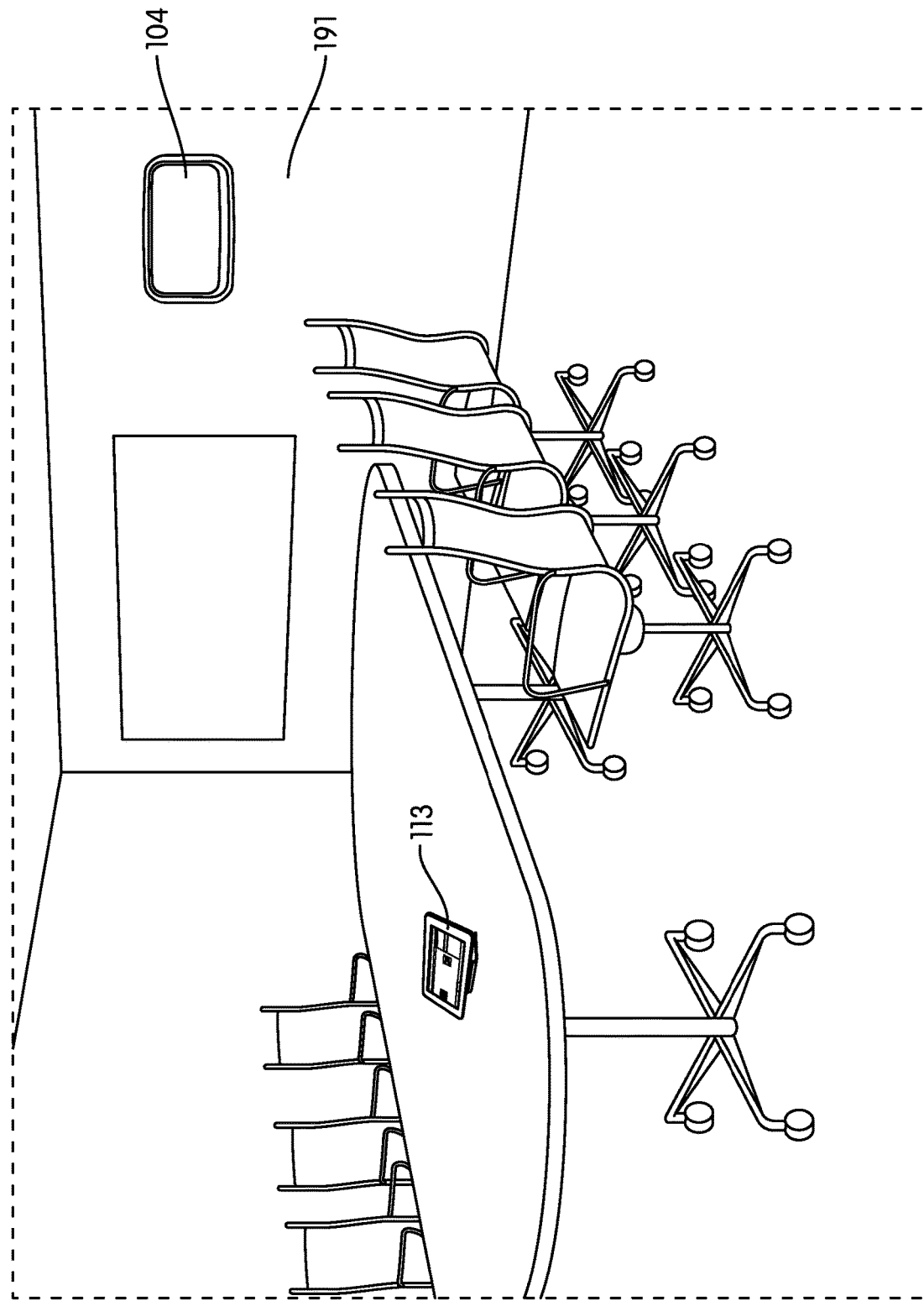
FIG. 6 shows an exemplary air purifying system and a corresponding user interface disposed in a room/space in accordance with an embodiment of the present patent application.

As shown in FIG. 6, the air purifying system 104 may optionally be constructed and designed to be mounted on a vertical surface like a wall 191 of the targeted zone so that the air purifying system 104 does not take up the floor space. The air purifying system 104 may be mounted on the wall using a bracket member (not shown) and one or more fastening members (not shown) for mounting the bracket member to the wall 191. As would be appreciated by a person skilled in the art, the bracket member and the air purifying device's housing may each include cooperating mating structures that enable positioning and locking of the air purifying system 104 on the bracket member. The air purifying system 104 may be hardwired from the wall 191 allowing the air purifying system 104 to be installed into commercial public areas such as restrooms where a corded unit is not allowed. In other embodiments, the air purifying system 104 may be constructed and designed to be mounted on a horizontal surface of the targeted zone, such as the floor of the targeted zone or the ceiling of the targeted zone. The air purifying system 104 may be mounted on the wall such that a lowest point of the air purifying system 104 is positioned at a predetermined distance above floor of the targeted zone. The predetermined distance (i.e., distance from the lowest point of the installed air purifying system 104 to the floor of the targeted zone and the highest point toward the ceiling) may range between about 3 inches for the floor standing models and 10-12 inches off the floor and about 10-15 inches from the ceiling for the wall mounted units.

The housing 126 may include the air inlet 122 configured to receive ambient air and the air outlet 124 configured to exhaust or deliver purified air. The housing 126 provides an airflow path 163 from the air inlet 122 to the air outlet 124. The air intake/inlet 122 and the air outlet 124 may include a grill. For example, when installed or mounted on the wall of the targeted zone, the air purifying system 104 draws air in from (the grill of) the air inlet 122, draws air through portions of the airflow path 163 in the housing 126 and exhausts the purified air through (the grill of) the air outlet 124. This airflow pattern of the air purifying system 104 enables the air purifying system 104 to be wall mounted. Also, this airflow intake and exhaust pattern of the air purifying system 104 allows the air purifying system 104 not to agitate any flat surfaces and floors in proximity (around and near) to the air purifying system 104 and not to send settled viruses and germs air born again. The air purifying system 104 exhausts purified air at the breathing level. This creates an airflow that drives air to the floor below the breathing level and then draws that air into the air purifying system to be purified.

The fan 120 of the air purifying system 104 is configured to move the air through the airflow path 163 between the air inlet 122 and the air outlet 124. The fan 120 of the air purifying system 104 may be operated at different fan speeds (e.g., five different fan speeds), or a continuous range of fan speeds. The different fan speeds may include Turbo fan speed at 1150 rpm, High fan speed 730 rpm, Medium fan speed at 575 rpm, Low fan speed at 400 rpm, and Sleep at 0 rpm. The fan 120 of the air purifying system 104 may be operated at four different fan speeds. However, the fan speeds can vary significantly in number, or be continuously variable.

The drive mechanism (e.g., motor) 116 is configured to provide power to draw air into the air inlet 112, draw air through the airflow path 163 and deliver/exhaust air out of the air outlet 124 of the housing 126. The drive mechanism 116 may be an electric motor. The motor may be a brushless DC motor. In other embodiments, the drive mechanism includes a battery operated motor or other drive mechanisms that are configured to provide power to draw air into the air inlet 112, draw air through the airflow path 163 and deliver/exhaust air out of the air outlet 124 of the housing 126. The drive mechanism 116 may include an output or motor shaft. The fan 120 is mounted to the output shaft to draw air into the air inlet 122, draw air through the airflow path 163 and deliver/exhaust air out of the air outlet 124 of the housing 126. The drive mechanism 116 may be connected to a first end of the output or motor shaft and the fan 120 is connected to a second end of the output shaft. The air purifying system 104 may also include a power switch and other electrical contacts for connecting a power cord from a source of electricity for operation of the air purifying system 104.

FIG. 9 shows a block diagram of the air purifying system 104 with a motor (with a RPM sensor), an air filter and the fan 120 arrangement. For example, this type of arrangement may use a Brushless DC electric motor (BLDC) motors since these BLDC motors are very energy efficient and may already include onboard controllers with RPM sensors. In another embodiment, the motor controller arrangement may reside off the motor. Since the motor is placed after the air filter, and as the airflow through the air filter changes due to a plurality of events, but mostly due to the air filters filling with entrapped particles over the life of the air filter, the power drawn by the motor changes during these events as the motor controller attempts to keep the motor running at a predetermined performance level for the selected performance setting.

As the filter collects particulate and its resistance to air flow increases, the filter approaches the end of its useful life. This progress can be measured using one or multiple variables, for example, by checking the fan speed and the power or current drawn by the motor, using a known relationship between these values, which was previously established for each filter. This relationship can be established, and the filter life measured, for multiple distinct performance levels, independent of a separate relationship to hold air flow or fan speed constant.

In one embodiment, the air purifying system includes an air purifier mechanism received in a housing, a sensor and a controller. The housing and the air purifier mechanism have the same configuration, arrangement and operation as described above. The sensor, in this embodiment, is configured to measured one or more operational parameters of the air purifier mechanism to generate operational parameter data. The controller is configured to: receive operational parameter data, compare the operational parameter data with corresponding predetermined threshold range, and determine, based on the comparison, that the air purifying sub-system is not functioning in accordance with predetermined criteria. For example, the one or more operational parameters of the air purifier mechanism may include fan speed, power or current drawn by the motor, etc. The controller is configured to establish a known relationship between these operational parameters of the air purifier mechanism for each filter. The controller is also configured to use these previously established relationships (for each filter) to measure the life of the filter.

For example, when the air purifying system 104 is set on a medium performance setting, an allowable range for current drawn has been determined for each range of fan speed. As the filter ages and the current drawn leaves the acceptable range, the fan speed is adjusted upward until a speed is reached where the current drawn is within the acceptable range for that fan speed. For each performance setting, there will be a fan speed and corresponding current drawn, which, once achieved, will indicate that the filter is full of particulate and should be replaced.

Figure 12:
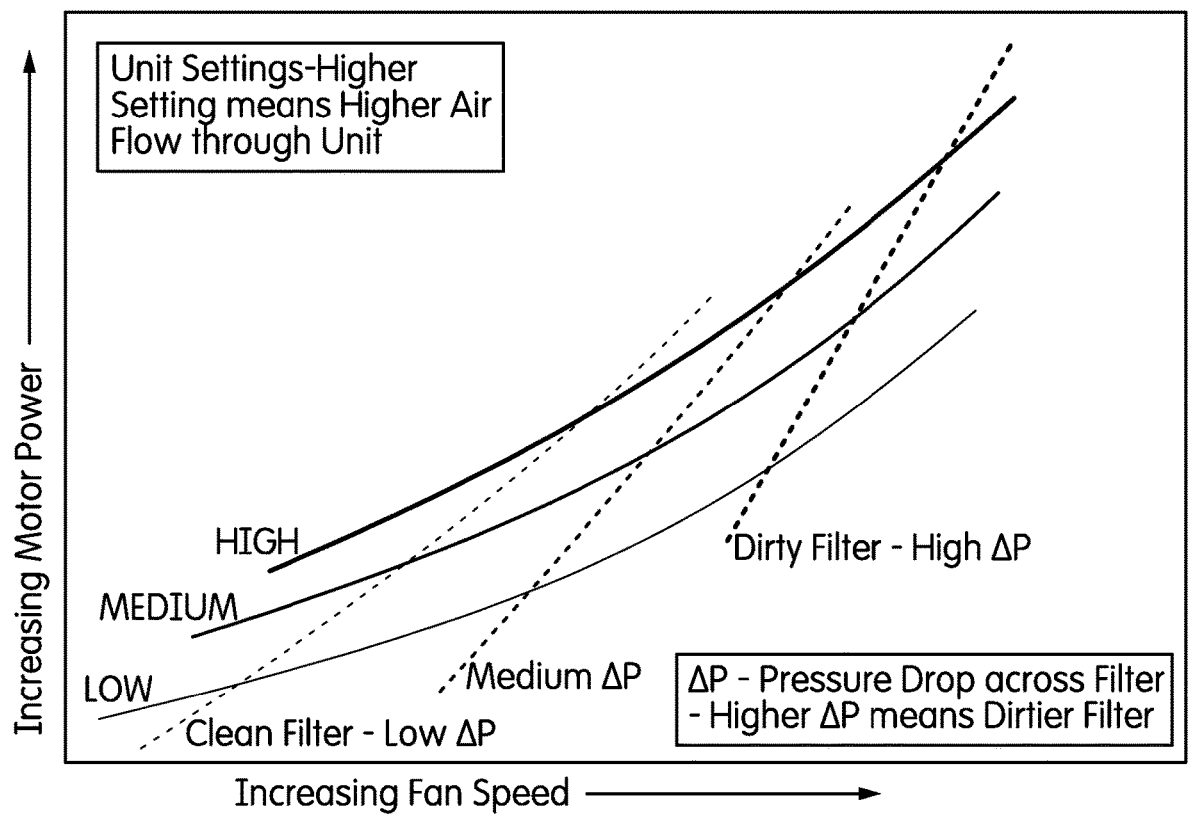
FIG. 12 is a graph illustrating a correlation between the power drawn by a motor of the air purifying system and the speed of the fan in accordance with an embodiment of the present patent application.

FIG. 12 is a graph illustrating a correlation between the power drawn by the motor of the air purifying system and the speed of the fan in accordance with an embodiment of the present patent application. For example, the power drawn by the motor of the air purifying system is on the left hand side Y-axis of the graph and the fan speed is on the X-axis of the graph. The correlations for three performance settings of the air purifying system including high, medium and low performance settings are shown by solid lines in FIG. 12. For example, high performance setting refers to higher air flow through the air purifying system. Pressure drop across the filter is also shown (e.g., by dotted lines) in FIG. 12. Higher pressure drop is observed for the dirty filter, lower pressure drop is observed for the clean filter, and so on.

The air purifying or filtering sub-system 118 may be provided in the airflow path 163 for filtrating contaminants present in ambient air passing therethrough. Each air purifying system 104 is 1) configured to receive different types of filtering media, different types of air purifying components, or different types of air filtering media and air purifying components, 2) to determine the type of filtering media, the type of air purifying components or the type of air filtering media and air purifying components that has been inserted into the air purifier, and 3) to adjust its operation based on the type of filtering media, the type of air purifying components or the type of air filtering media and air purifying components that has been inserted therein.

The air filtering sub-system 118 may include a High-Efficiency Particulate Absorption (HEPA) Filter and a carbon filter. The air filtering sub-system 118 may also be configured to create an ionized field so as to purify the air. The air filtering sub-system 118 may have any type of filter media and/or purification technologies such as Thermodynamic Sterilization technology, Ultraviolet germicidal irradiation technology, HEPA filter, Ultra-Violet Photocatalytic Oxidation (UVPCO) technology, Electrostatic technology, Activated Carbon filter, Photocatalytic Oxidation technology, Titanium dioxide (TiO$_2$) technology, Ionizer purifying technology, Ozone generator technology, etc. For example, the air filtering sub-system 118 may include two or more UV-C lamps. The air filtering sub-system 118 may include a filter having a Minimum Efficiency Reporting Value (MERV) that generally ranges from about MERV-13+ to MERV-17+. The air filtering sub-system 118 may include a granular/granulated (not pellets) activated Carbon filter.

The air filtering sub-system 118 may include a pre-filtering component, an activated carbon filtering component, a MERV-13+ filtering component or a True HEPA (MERV-17+) filtering component, two or more UV-C lamps, and a Photocatalytic air purifying component (e.g., $TiO_2$). The air filtering sub-system 118 may also include a plasma (ionizer) air purifying component. The True HEPA filtering component of the air filtering sub-system 118 may also include an anti-microbial agent.

The sensing device 108 may include a multitude of sensors that are configured to sample the airflow entering, the airflow flowing through and the airflow exiting the air purifying system 104. For example, the sensing device 108 may include Volatile Organic Compound (VOC) or gas sensors, and/or particle sensors.

The sensing device 108 may include an air purity or air quality sensor that is configured to monitor the quality of the airflow stream through the air purifying system 104. The air purity or air quality sensor may be configured send an output signal (air quality/purity signal) to the controller 106. The controller 106, in response to the received air quality/purity signal from the air purity or air quality sensor, either may automatically adjust the operation of the air purifying system 104 or may notify the user about the air quality. For example, the controller 106 may display the air quality data to the user by graphical representation, visual representation (percentage, number or a changing color), audio signal or any other communications channels.

The sensing device 108 may include an air quality sensor on the outlet flow side of the air purifying system 104. For example, an outlet air quality sensor 107 is shown in FIG. 1. The outlet air quality sensor 107 is configured to measure the air quality on the outlet side of the airflow (i.e., after passing through the air filters of the air purifying system 104).

The sensing device 108 may include an air quality sensor on the inlet flow side of the air purifying system 104. For example, an inlet air quality sensor 109 is shown in FIG. 1. The inlet air quality sensor 109 is configured to measure the ambient air quality outside the air purifying system 104 and/or measure the air quality on the inlet side of the airflow (i.e., before passing through the air filters of the air purifying system 104).

The sensor outputs are then compared against a set of criteria by way of firmware embedded on the controlling integrated circuit or controller 106. The controller 106 then sets the air purifying system 104's actions per the pre-established firmware (or other logic, such as in an ASIC). The sensing device 108 can sample the airflow stream to make a comparative analysis which the controller 106 uses to determine the air purifying device's functions by way of the predetermined actions written into the unit's firmware. FIG. 1 shows two air quality sensors disposed in different (outlet flow side and inlet flow side) locations within the same air purifying system 104.

The sensing device 108 may also be configured to measure an air quality parameter of the ambient air in a predetermined area proximate the air purifying system 104 to generate surrounding air quality data. The surrounding air quality data may be used by the controller 106 by itself, for example, to control the operation of the air purifying system 104. For example, the controller 106 may use the surrounding air quality data to run the fan 120 at a high speed so as to deliver highest purified air output (with the highest CFM output) The surrounding air quality data may be used by the controller 106 to switch between a higher operational state and a lower operational state (or enter into an energy conservation mode/state) of the air purifying system 104. In other embodiments, the surrounding air quality data may be used by the controller 106 in combination with other sensor data obtained from other sensors of the sensor device 108 to control the operation of the air purifying system 104. In one embodiment, the surrounding air quality data may be the same as the inlet air quality data.

The sensing device 108 may also be configured to detect one or more conditions in the predetermined area proximate its respective air purifying system 104. The controller 106 may be configured to use sensor data representing one or more conditions detected in the predetermined area proximate its respective air purifying system 104 in conjunction with the inlet/outlet air quality data to pin point more accurately other additional sources of the air purifying device's 104 performance anomalies as will be described in detail in the discussions below.

For example, the sensing device 108 of the air purifying system 104 may include a motion sensing device, a light sensing device, a laser sensing device, a radiation sensing device, a temperature sensing device, an audio sensing device, a proximity sensing device, an Infrared (IR) beam sensing device, and/or any other sensing devices that are configured to detect one or more conditions (motion, light (visible or non-visible), radiation, temperature, acceleration, Radio Frequency (RF) signals, sound waves, and/or Infrared (IR) signals) in the predetermined area proximate its respective air purifying system 104. These sensors may be disposed on a sensor board 111 as shown in FIG. 1. For example, the sensing device 108 may be an audio sensing device capable of detecting flushing activity (e.g., when a toilet is flushed in a wash room), a door opening and closing noise, and/or traffic of any object (person or other movable living things) within the predetermined area proximate its respective air purifying system 104. The sensing device 108 may be configured to detect other noise levels within the predetermined area proximate its respective air purifying system 104 as long as the noise levels, dB are significantly high enough to be detected and/or have a signature audio pattern.

The audio sensing device may first detect the noise level and the motion sensing device may then detect motion/activity related to the detected noise level over a certain amount of time. The controller 106 is configured to receive both the sound/noise signal from the audio sensing device and the motion signal detected by the motion sensing device and to respond accordingly. For example, the audio sensing device may detect the toilet flushing noise in the wash room and the motion sensing device may then detect that someone left the wash room.

The sensing device 108 may include an odor sensing device for detecting odor components in the targeted zone, and a dust sensing device for detecting dust particles in the targeted zone. The sensing device 108 may also include sensing device(s) configured for detecting allergens (pollen, animal/pet dander or mold), particulate matters (bacteria or virus), pollutants, smoke, Volatile organic compounds (from sources such as paints, and other solvents, aerosol sprays, cleansers and disinfectants, air fresheners, stored fuels and automotive products and hobby supplies) and/or other air quality related parameters in the targeted zone. The sensing device 108 may include a temperature sensing device for detecting temperature in the targeted zone, and a humidity sensing device for detecting humidity in the targeted zone.

The sensing device 108 may generally include a transmitter for transmitting signals produced by a signal generator of the sensing device 108 and a receiver for receiving back those same signals after they interacted with an environment. As such, the sensing device 108 acts as a proximity sensing device capable of detecting the presence of any object (person or other movable living things) within the predetermined area proximate its respective air purifying system 104.

The sensing device 108 may include a motor speed sensor that is configured to sense operating speed of the motor and produce motor speed-related data. The sensing device 108 may also include a motor current sensor configured to sense the current drawn by the motor and produce motor current-related data.

The controller 106 may include a control circuit. However, the controller 106 may alternatively include any other type of suitable controller without deviating from the scope of the present patent application. For example, the controller 106 may include a processor executing code; an integrated computer system running a program; analog or digital circuitry; etc.

The air purifying system 104 also may include a memory device connected to, or integral with, the controller 106 for storing information related to the air purifying system 104. The stored information, for example, may include predetermined threshold ranges, predetermined criteria, determined cycles, patterns and usage flows of the air purifying system 104. The memory device may also be configured to store other settings or parameters of the air purifying system 104. The controller 106 may store information within the memory device and may subsequently retrieve the stored information from the memory device. The memory device may include any suitable type of memory, such as, for example, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory or any other suitable memory.

The controller 106 is configured to receive the inlet air quality data and the outlet air quality data, and compare the inlet air quality data and the outlet air quality data with their corresponding predetermined threshold ranges.

The controller 106 is configured to diagnose a malfunction of the air purifying system 104 based on the comparison of the inlet air quality data and the outlet air quality data with their corresponding predetermined threshold ranges. For example, when the received inlet air quality data is within its corresponding predetermined threshold range and the received outlet air quality data is not within (e.g., less than) its corresponding predetermined threshold range, then the controller 106 determines that one or more components of the air purifying system 104 are not functioning properly in accordance with a predetermined criteria.

The one or more components of the air purifying system 104 may include the filter component(s)/element(s), purifying component(s)/element(s), the fan 120, the drive mechanism 116 (including the motor) and/or any other components of the air purifier mechanism.

The predetermined threshold ranges for the inlet air quality data and outlet air quality data may be provided by the user. The predetermined threshold ranges for the inlet air quality data and outlet air quality data may depend on different environments in which the air purifying system 104 is used. For example, the predetermined threshold ranges for the inlet air quality data and outlet air quality data when the air purifying system 104 is used on a residential environment may be different from the predetermined threshold ranges for the inlet air quality data and outlet air quality data when the air purifying system 104 is used on a commercial, a medical or an industrial environment.

The predetermined threshold ranges for the inlet/outlet air quality data may be determined by the controller 106 using previously obtained inlet/outlet air quality data from the same air purifying system 104 positioned in the same or similar targeted area(s). The predetermined threshold ranges for the inlet/outlet air quality data may be determined by a computer system operatively connected to a plurality of air purifying systems 104 using previously obtained inlet/outlet air quality data from the plurality of the air purifying systems 104 positioned in the same or similar targeted area(s).

The predetermined threshold range for the outlet air quality data may depend on the size of the air purifying system 104 being used. The predetermined threshold range for the outlet air quality data may depend on the operational performance of the air purifying system 104 being used.

The predetermined threshold range for the outlet air quality data may depend on the type of the filter element(s)/component(s) and/or purifying element(s)/component(s) being used in the air purifying system 104. The predetermined threshold range for the outlet air quality data may be determined by the controller 106, for example, when the air filter was newly installed in the air purifying system 104.

In some embodiments, the controller or the computer system 106 may also be configured to continuously obtain subsequent air quality data from one or more air purifying devices 104. As an example, the subsequent air quality data may comprise additional information corresponding to a subsequent time (after a time corresponding to data that was used to determine the air quality data). The subsequent air quality data may be utilized to further update or modify the predetermined threshold ranges (e.g., new data may be used to dynamically update or modify the predetermined threshold ranges), etc. In some embodiments, the controller or the computer system is configured to then continuously modify or update the predetermined threshold ranges based on the subsequent air quality data.

The controller 106 may also be configured to compare the received inlet air quality data with the received outlet air quality data. The controller 106 is configured to diagnose a malfunction or performance drop off of the air purifying system 104 based on this comparison. For example, if the controller 106 determines that the inlet air quality data is same as the outlet air quality data, then the controller 106 determines that the one or more components of the air purifying system 104 are not functioning properly in accordance within predetermined criteria.

The controller 106 may also be configured to determine a cause as to why the one or more components of the air purifying system are not functioning in accordance with the predetermined criteria. For example, the cause may include a filter element/component of the air purifying system 104 is not installed properly in the air purifying system 104, a filter element/component of the air purifying system 104 is inserted incorrectly in the air purifying system 104, a filter element/component of the air purifying system 104 has been damaged, and/or a filter element/component of the air purifying system 104 needs replacement.

In one embodiment, the drive mechanism 116 of the air purifying system 104 includes a motor that is in communication with the sensor 108 and the controller 106. The drive mechanism 116 is configured to drive the fan at least one predetermined speed to move the air through the airflow path 163 between the air inlet 122 and the air outlet 124. The sensor 108 is configured to sense the current drawn by the motor and produce data related to motor current. The controller 106 is configured to receive the motor current-related data and compare the motor current-related data with its corresponding predetermined threshold. The controller 106, based on the comparison of the motor current-related data with its corresponding predetermined threshold, is configured to determine that one or more components of the air purifying system 104 are not functioning in accordance with a predetermined criteria. In one embodiment, the current drawn by the motor changes to maintain the fan at the at least one predetermined speed when the one or more components of the air purifying system are not functioning in accordance with the predetermined criteria.

In one embodiment, the predetermined threshold includes a single threshold motor current for a given constant motor RPM. For example, for each motor RPM, there is a corresponding motor current threshold.

In one embodiment, the air purifying sub-system 118 includes removable filter media. In one embodiment, the predetermined threshold includes a range (of values) that corresponds to when the removable filter media is absent or incorrectly installed. In one embodiment, the predetermined threshold includes a range (of values) that corresponds to when the filter media is filled with entrapped particles. In one embodiment, the predetermined threshold includes a range (of values) that corresponds to when the filter media has been compromised. In one embodiment, the controller 106 is configured to send the determination that one or more components of the air purifying system 104 are not functioning in accordance with the predetermined criteria to a user interface 113 that is configured to be removably attached to the air purifying system 104.

The controller 106 may be configured to display, on the user interface 113, to a user that the one or more components of the air purifying system 104 are not functioning in accordance with the predetermined criteria. The controller 106 may also be configured to produce/generate an alarm in response to the determination that the one or more components of the air purifying system are not functioning in accordance with the predetermined criteria.

The particle sensor arrangement in combination with other sensors may be able to pin point more accurately other additional sources of performance anomalies of the air purifying system 104. For example, a failing fan motor or an aging fan motor may be detected by reviewing the fan motor's RPM profile and current profile in combination with the inlet and outlet air quality data from the particle sensor arrangement.

When the controller 106 detects a slower inlet flow particle reduction rate (i.e., taking more time to reduce count to a certain recorded level) while detecting a standard or nominal (expected or normal) outlet flow count (after the air filters of the air purifying device), the controller 106 determines the air purifying device's lower performance is due to the motor vs. a failing or failed filter. For example, during a determined time cycle (e.g., 48 hours), the air purifying system 104 may see the cyclical time it takes to reduce the particle count within the installed environment. If it has been determined that the air purifying system 104 seems to take longer to reduce the incoming particle count levels (over a relative long time) with all other major variables being the same, it could be concluded the air purifying system's 104 performance level is failing.

In another example, when the inflow particle sensor detects a slower than normal decline in particle count over a given time (an abnormal condition) and the motor RPM sensor and current sensor detect normal conditions, while the outflow particle sensor detects a higher than normal condition (an abnormal condition), the controller 106 determines that the filter or filter seal of the air purifying system 104 has been compromised.

The controller 106 may also be configured to receive current data from a current sensor, and motor RPM data from a motor RPM sensor. The current data and the motor RPM data may be used for detecting the life of an air filtration component of the air purifying system 104. For example, the current data from a current sense circuit in conjunction with the motor RPM data from the motor's RPM detector or sensor are used to determine with more accuracy the predicted life of a filter component of the air purifying system 104 in its installed environment.

The controller 106 is configured to receive the motor current-related data and motor speed-related data, and compare the motor speed-related data and the motor current-related data with their corresponding predetermined threshold ranges. The controller 106, based on the comparison of the motor speed-related data and the motor current-related data with their corresponding predetermined threshold ranges, is configured to determine that one or more components of the air purifying system are not functioning in accordance with a predetermined criterion.

The air purifying system 104, the controller 106, and the firmware may be used in conjunction with the motor RPM detector/sensor and the current sense circuit to determine if the motor's current drawn for a given motor speed (RPM) is lower than an initial baseline reading. For example, the initial baseline reading may be taken when the air filter was newly installed in the air purifying system 104. Aging air filter(s) may cause restricted airflow. When there is more restricted airflow (due to aging air filter(s)), the motor (or motors in multi-air channel machines) need to adjust to stay at the predetermined RPM profile for a given performance setting (predetermined airflow parameter). FIG. 12 shows an illustration of what adjustments are needed to maintain the predetermined airflow parameter. This in turn impacts the motor current drawn profile of the motor. Taking these variables into consideration, the controller 106 is configured to determine the predictable life stage of the installed filter.

At current reading values above the initial baseline reading at an expected RPM constant, the controller 106 is configured to signal/communicate the predicted life of the filter by looking up the current reading values against a predetermined criterion within the controller's firmware. At certain times, such as when a new filter is being installed, calibration sequence is used to determine the filters initial baseline reading. By way of this calibration sequence, the controller 106 also determines at that time if and what type of filter has been installed by comparing the sensor readings against a predetermined expected table of values.

A true HEPA filter has a range of expected values since the flow through the HEPA filter is less than just a carbon filter or non-HEPA type filter. A hybrid filter with both carbon and HEPA media would be more restrictive in air flow than just the HEPA filter only. Due to these predictable variables, the air purifying system 104 is configured to determine which filter has been newly installed after it has gone through a calibration sequence.

In one embodiment, when a new filter media is being installed in the air purifying system, the controller is configured to initiate a calibrate sequence that determines the predetermined threshold range for the new filter media.

The air purifying system 104 may include the user interface 113. The user interface 113 may be operatively connected to the controller 106 and is configured to display information (e.g., operational performance) of the air purifying system 104 to a user, and/or solicit information from the user (e.g., allow the user to enter data and/or other parameters of the air purifying system 104).

The user interface 113 may include one or more buttons or other controls that allow the user to modify one or more parameters of the air purifying system 104. For example, the one or more buttons or other controls of the user interface 113 may be operated by touch or tactile manipulation or mechanical type control. The user interface 113 may be a display such as a graphical display. The display may be a touch screen display or a liquid crystal display (LCD) display. The user interface 113 may include a Smart Touch feature that provides a touch activated control panel. The user interface 113 may be a capacitive touch panel.

Referring to FIGS. 2, 5a, 5b, and 6, in one embodiment, the user interface 113 is configured to be removably attached to the air purifying system 104 such that the user interface 113 is configured to reside on the air purifying system 104 and function as the primary user interface. In one embodiment, the user interface 113 is configured to be removed from the air purifying system 104 and the user interface 113 is configured to be placed at a remote location. In such an embodiment, the user interface 113 is configured to be operated from the remote location. In one embodiment, the remote location refers to a location that is remote from the air purifying system 104. In one embodiment, the user interface 103 includes a rechargeable power supply that is configured to be charged when the user interface 113 is attached to the air purifying system 104. The user interface 113 and the air purifying system 104 may be communicated by wired or wireless signals when the user interface 113 is disconnected and remote.

Figure 4:
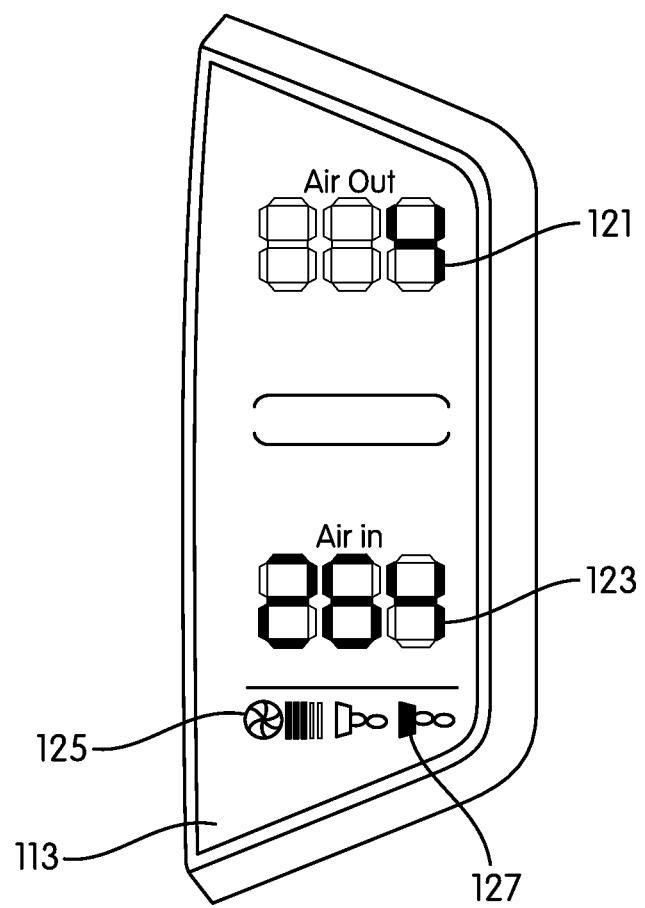
FIG. 4 shows an exemplary user interface that is mounted on the air purifying system of the present patent application.

The user interface 113 resides on the air purifying system 104 to provide feedback about the state of operation of the air purifying system 104 to the user. The user interface 113 may optionally have input controls for the user. The input controls of the user interface 113 may change the orientation of, and/or the information displayed thereon. The user interface 113 is configured to display one or more of the following data: sensor readings, operational state of the air purifying system 104, filter types, and life of the filters. Referring to FIG. 4, the user interface 113 is configured to display the outlet air quality data 121, the inlet air quality data 123, fan speed 125, filter replacement indicator 127, etc. There may be alternative or additional inputs which communicate with the controller 106 of the air purifying system 104 to change the functional parameters of the air purifying system 104.

The user interface 113 is configured to display an inbound air sensor data and outbound air sensor data in an easily understandable format to the user. For example, the inbound and outbound air sensor data are displayed in such a way as to allow the operator/user to see and understand the displayed data/information easily (e.g., the ability to observe the difference between the two data points). Based on the displayed data/information, the user can observe the air purifying system's state of operation and its effectiveness, and/or the user can determine if the settings of the air purifying system are optimized.

The controller 106 of the air purifier 104 may be configured to determine and notify the user, via the user interface 113 by visual, audio signal or any other communications means when servicing of the air purifying system 104 (e.g., filter replacement or purifying component replacement is needed) is needed. The air purifying system 104 may include a service light that alerts the user (by flashing or otherwise) that the air purifier is in need of either maintenance or repair. The user interface 113 may include filter change indicators (HEPA filter replacement indicator, carbon filter replacement indicator, and a Powered filtering component filter replacement indicator) that signal the user when the HEPA, Carbon and/or powered filters need replacing. The user interface 113 may include air purifying system servicing/maintenance indicators that signal the user when air purifying system needs servicing/maintenance. The user interface 113 may include a sleep mode indicator to indicate that the air purifying system 104 is in a sleep mode. The user interface 113 may also include odor level indicators that provide feedback to the user regarding the odor level sensed by the odor sensor.

The user interface 113 may be hardwired or wireless. The user interface 113 may be battery powered or may be powered by the power source of the air purifying system 104. The user interface 113 may be portable. The user interface 113 may be removably mounted onto the air purifying system 104. The user interface 113 may be removed and used when separated from the air purifying system 104 and communicate with, and/or receive data from the air purifying system 104 itself through wired or wireless means or both. The user interface 113 may include a controller therein.

The user interface 113 with and without an integrated air quality sensor (such as a particle sensor) and/or an array of sensors that communicate with a single air purifying system or multiple air purifying systems and/or smart fans by way of a communication path. The communication path may include a direct communication means and an indirect communication means to other communicatively interconnected air purifying systems through the initially engaged air purifying system. The communication paths can be a direct wireless communication means to a single air purifying system and an indirect communication means to other communicatively interconnected air purifying systems by way of, but not limited to, infrared, ultrasonic, Bluetooth, NFC, Wi-Fi etc. The communication paths may also include communication through a complex communication means by communicative interaction that includes wireless communication means through an intranet or internet connection which can optionally interact with a cloud based server which resides on or off location and functions as the virtual controller of the air purifying system, or a select sub group, or an entire group of air purifying systems. The user interface 113 is configured to be operatively connected to the air purifying system to control the operation of the air purifying system. In some embodiments, the user interface 113 is positioned at a remote location from the air purifying system and includes a sensor device that is configured to measure an air quality parameter of the ambient air in a predetermined area proximate the user interface to generate surrounding air quality data. The controller 106 is configured to operate the air purifying system 104 based on the generated surrounding air quality data to ensure the air quality of the ambient air in the predetermined area proximate the user interface is within a predetermined level.

For example, the air purifying system 104 is configured to operate and reduce the particle count at the position of the remote 113 (vs. only at and around the air purifying system 104 itself). Since the remote 113 has an air quality sensor, the air purifying system 104 on the wall 191 is configured to operate at the appropriate performance level to ensure the air quality around the remote 113 is at the acceptable level vs. the air quality just around the air purifying system 104. This ensures the air envelope around the remote 113 is at an acceptable level. That is, it ensures that a working area (wherever the user interacts with the remote 113) is also healthy. For example, the remote 113 (with built in air quality sensors) may be placed near/by the baby to ensure the air quality near the baby reaches and is maintained a healthy level even though the air purifying system 104 may be on a far wall or even in another room. This feature of the air purifying systems 104 with the remote 113 adds additional value and improves the functionality of the currently existing remotes that are used with the air purifying systems 104.

Figure 11:
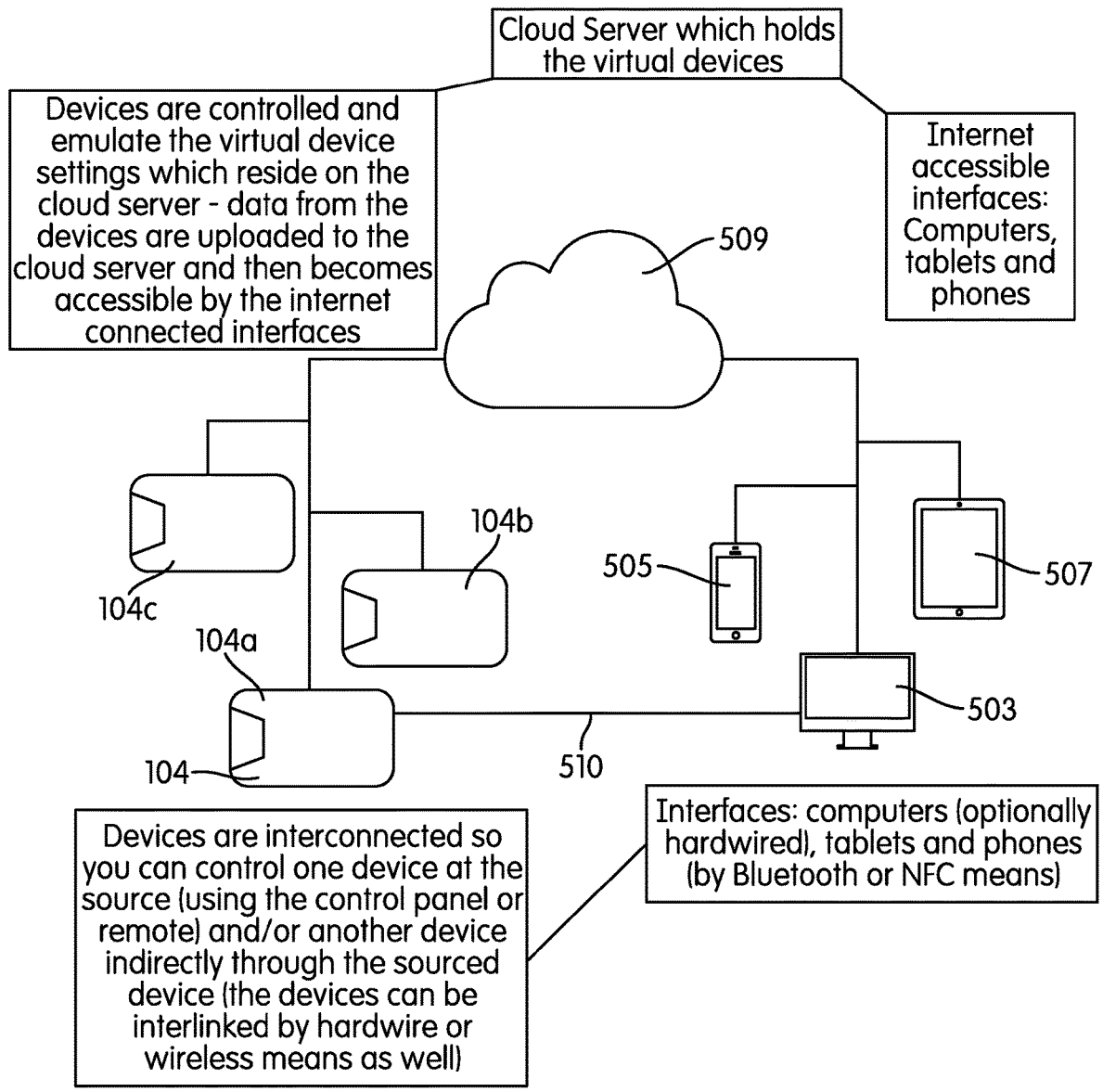
FIG. 11 shows an exemplary communication system for the air purifying system in accordance with an embodiment of the present patent application.

Referring to FIG. 11, the plurality of sensors and the ability of the air purifying system 104 to use the information derived from the plurality of sensors as to ensure a desired level of performance is met depends on how the air purifying system 104, or an array of air purifying systems 104a-c interact as a collective system while still be controlled individually. Multiple air purifying systems 104a-c may communicate with each other by wired means or by wireless means using a communication device coupled to the controller 106, thereby establishing communications between the controllers 106 of the interlinked air purifying systems 104a-c. A communications path may include a direct communication means 510 for controlling a single air purifying system 104 at its location, or an indirect means through the directly contacted system 104, 104a to the other communicatively interconnected air purifying systems 104b, 104c. The communications means between the air purifying systems 104a-c can be by a directly wired means or by wireless means including, but not limited to, infrared, ultrasonic, Bluetooth, NFC etc. In one embodiment, as shown in FIG. 11, the one or more communication devices are configured to establish the communications between the controllers of the air purifiers via a connection selected from the group consisting of a Bluetooth connection, a WiFi connection, a LAN connection, a NFC connection, a Mesh connection, an internet cloud connection, an intranet cloud connection, an internet connection, and an intranet connection.

A more complex communication means may include wireless communication or wired means through an intranet or internet connection which optionally includes a cloud based means 509 using the server residing on or off locating as a virtual controller of the air purifying system or by interconnected means a multitude of air purifying systems 104a-c. This virtual controller (sometimes referred to as a virtual machine) may then be used to control a single air purifying system (directly or through a connection bridge), and or a multitude of interconnected air purifying systems 104a-c by allowing the air purifying system's controllers 106 to accept the virtual controller's inputs as well as export the air purifying system's data to the virtual controller. The virtual controller(s) can be accessed by any internet accessible device such as a computer 503, mobile phone 505 or tablet computing device 507.

Air purifying systems 104a-c are controlled and emulate the virtual air purifying system settings which reside on the cloud server 509. The cloud server 509 generally holds the virtual air purifying system(s). Air purifying systems 104a-c are interconnected so one air purifying system 104, 104a at the source (e.g., using the control panel or remote 113) can be controlled and/or other air purifying system(s) 104b, 104c can be indirectly through the sourced air purifying system 104, 104a. The air purifying systems 104a-c can be interlinked by hardwire or wireless means as well. Data from the air purifying systems 104a-c are uploaded to the cloud server 509 and then becomes accessible by the internet connected interfaces 503, 505, 507. In some embodiments, the interfaces 503, 505, 507 may include computers 503 (e.g., optionally hardwired), tablets 507 and phones 505 (connected via Bluetooth or NFC communication means).

The controller of the user interface 113 has the ability to control a single air purifying system 104 or a plurality of air purifying systems 104 by direct or indirect communication means through the communications paths as disclosed in the present patent application. The controller of the user interface 113 may take the form of being assembled directly to the air purifying system, semi attached as to be removable, or be in the form of a table top unit, a wall mounted unit, a smart phone, and/or smart tablet. The optional sensors may be integrated directly into the controller of the user interface 113, or be added as a modular addition, or be integrated into a base station that can when needed recharges the controller of the user interface 113, or can be modularly added or integrated into a phone or tablet case, or bracket, or holster. The controller of the user interface 113 can be hardwired and or corded for power a power source or utilize battery power with an optional power dock to recharge the batteries.

Figure 5A:
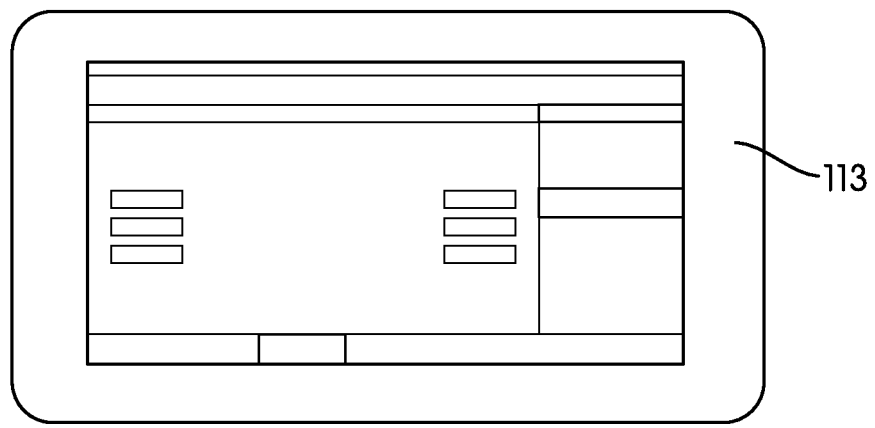
FIGS. 5a and 5b show another exemplary user interface that is removably mounted on the air purifying system of the present patent application.
Figure 5B:
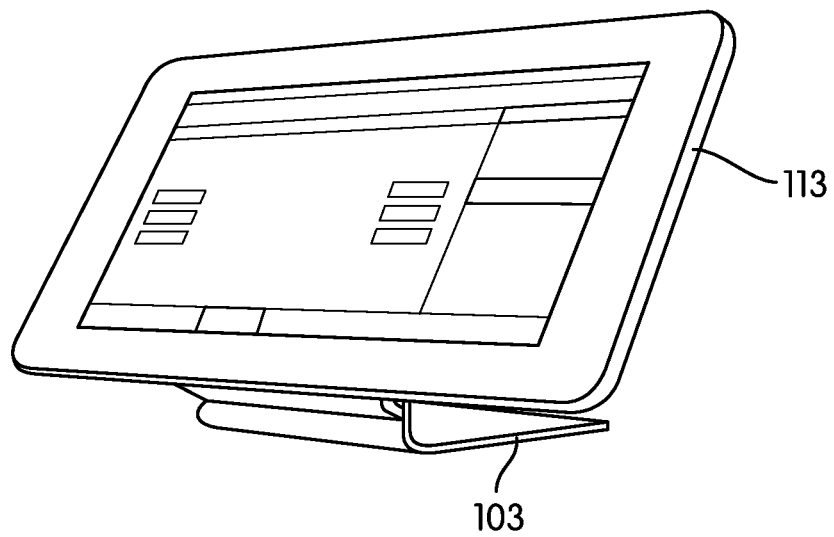

FIGS. 5a and 5b illustrate configurations for the user interface 113 with remote control capabilities. That is, the user interface 113 is optionally removably mounted into a dock 103. For example, FIG. 5a shows the user interface 113 in a wall mounted configuration, while FIG. 5b shows the user interface 113 in a table top configuration. The dock 103 may optionally be hardwired to directly control the air purifying system 104. The dock 103 may be configured to recharge the batteries of the user interface 113 (e.g., for a wireless control version when it is removable from and used away from the dock). The user interface 113 is configured to be moved between its wall mounted configuration and its table top configuration. The user interface 113 is configured as a removable battery powered wireless unit with wall and table top docking stations. The user interface 113 is also configured to be used in a hand held configuration.

The user interface 113 and/or the dock or base unit 103 (on which the user interface 113 docks) may include an air quality sensor and/or an array of sensors as disclosed throughout the present patent application. The air quality sensor and/or the array of sensors may be configured to be in communication with the air purifying system 104 or a plurality of air purifying systems configured to be servicing the area or zone in which the user interface 113 resides.

The onboard air quality sensor's readings and/or readings from the array of sensors are communicated to the air purifying system 104 or the plurality of air purifying systems within the control vicinity of the user interface 113. These sensor's readings are into consideration when determining if, and when the air purifying system 104 or the plurality of air purifying systems should change its performance parameters to ensure that the remotely sensed area achieves the ideal air quality measurements.

Typically, the air quality and other sensors reside on the air purifying system 104 themselves which can create a closed loop situation where the air purifying system 104 operates less efficiently, such as in cases where the air quality immediately within the vicinity of the air purifying system 104 is acceptable, yet only a few feet away or where the operator primarily resides can have a dramatically different air quality level and the air purifying system 104 can be blind to this type of irregularity without an additional remote reference point. This typically happens if the air purifying system 104 is on low or manual mode where the fan and motor are not on the highest performance setting.

The present patent application, thus, provides a remote sensor (does not reside in/on the air purifying system 104) disposed at a remote location that is still under the targeted area of the air purifying system 104. For example, the remote sensor may be integrated into the user interface 113 (with the controller). By having the remote sensor integrated into the user interface 113 allows an operator to place and/or mount the air purifying system(s) 104 within the most commonly occupied area of the room which in turn would target that particular area by functioning on a higher mode, or alternatively a lower mode for longer, depending on the setting selected on the air purifying systems 104. This would occur until the remote sensor (e.g., integrated into the user interface 113) detects a reading within the predetermined optimal range in which the air purifying system(s) 104 would then go/switch to a lower operational state or enter into an energy conservation mode or state. This type of functionality is achieved by communicating to the air purifying system(s) 104 the particular targeted area's air quality reading (and optionally other sensor readings if an array of sensors are being utilized). The air purifying system(s) 104 would then take into consideration the remote sensors input when adjusting and reacting to the performance characteristics and actions of the air purifying systems 104 to ensure the air purifying system(s) 104 is optimizing the air quality within the targeted zone which would now include the remote sensor's detection area or zone.

Figure 7:
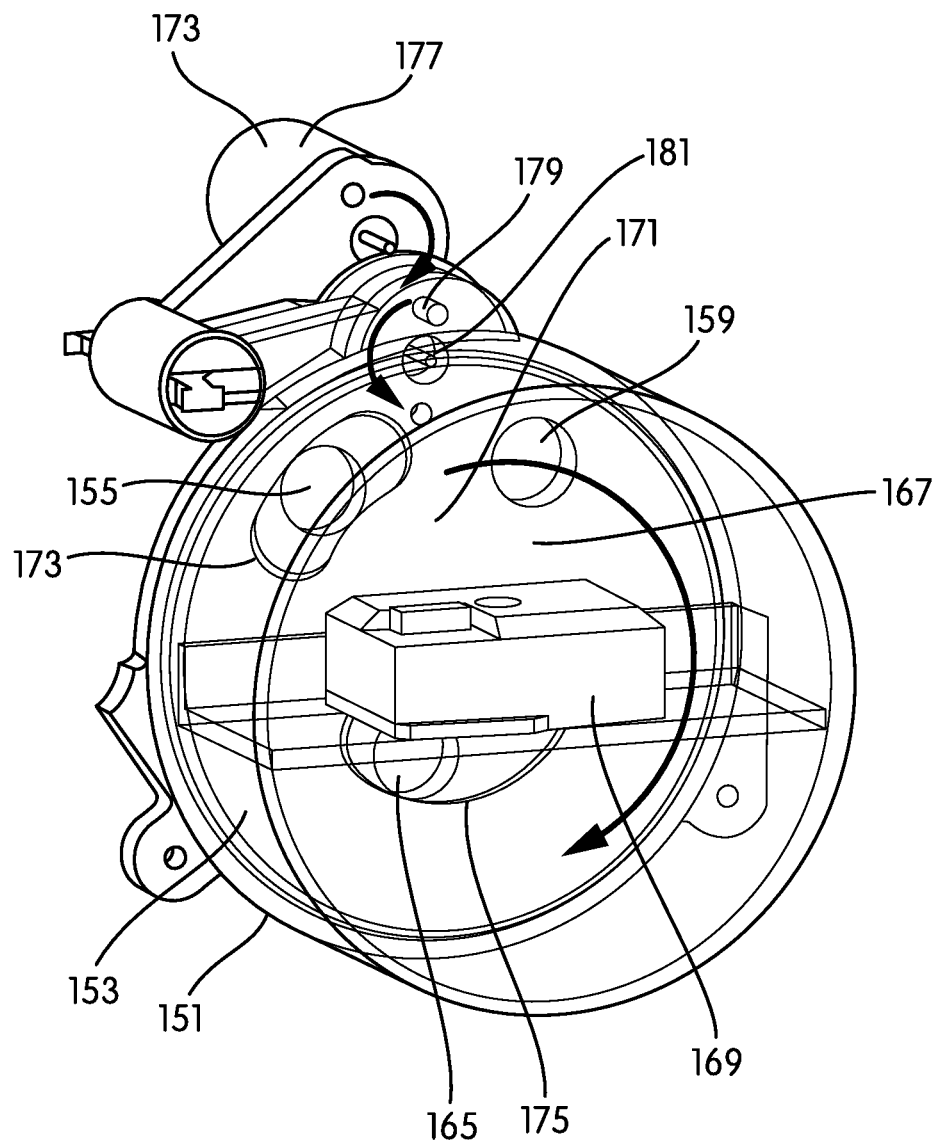
FIG. 7 shows an exemplary sensor system configured to be used with the air purifying system, where a flow directing member of the sensor system is shown in its first position in accordance with an embodiment of the present patent application.
Figure 8:
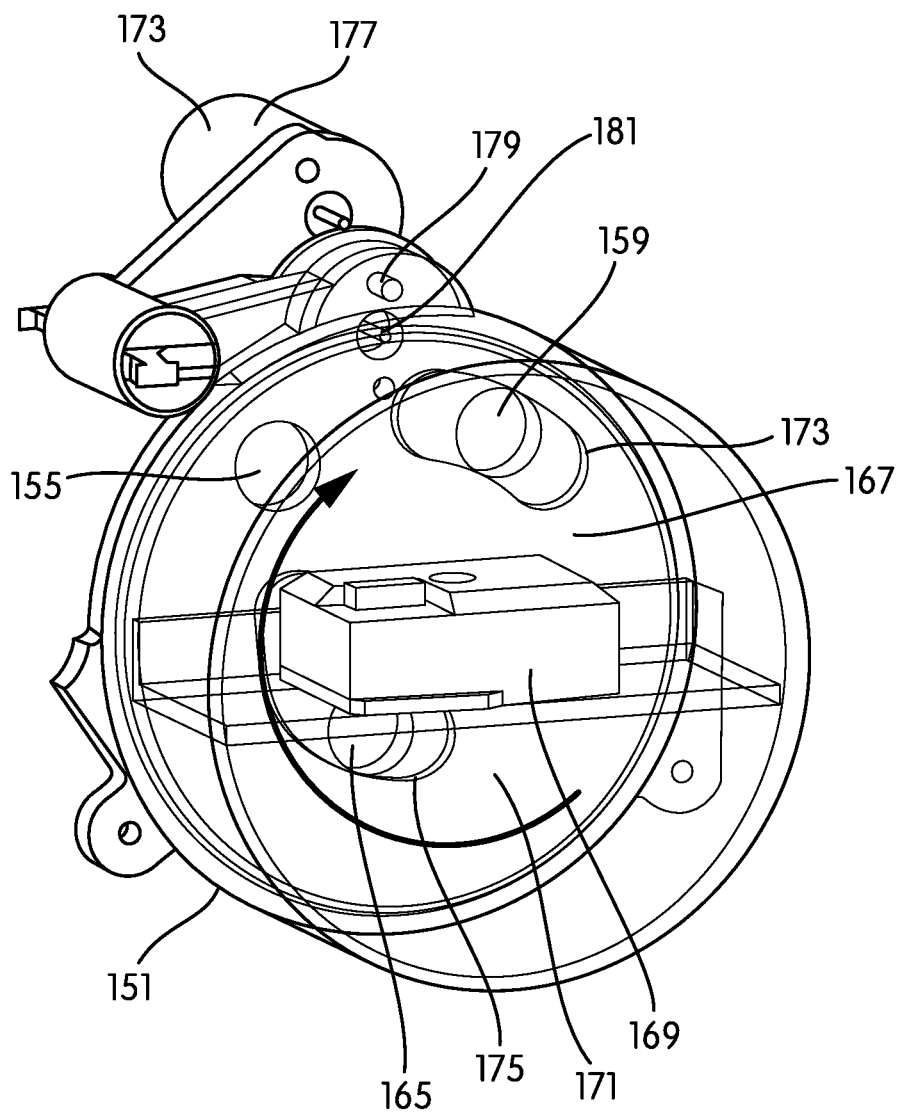
FIG. 8 shows another view of the exemplary sensor system, where the flow directing member of the sensor system is shown in its second position in accordance with an embodiment of the present patent application.

Referring to FIGS. 7 and 8, the air purifying system 104 may include the sensor assembly or system 151 that facilitates the use of the single air quality sensor 169 to sample air from multiple locations of the air purifying system 104. The sensor system 151 is configured to reduce the need for multiple air quality type sensors to be located in multiple locations of the air purifying system 104. The sensor system 151 is also configured to reduce costs, to simplify assemblies and to ensure the accuracy of the sensor readings. For example, with the use of the sensor system 151 with the single air quality sensor 169, the accuracy is a constant since it is relative upon itself. Whereas in a system with multiple sensors, each sensor would need to be calibrated with the other sensors to ensure comparative accuracy within the same air purifying system.

Air quality sensors, especially low cost particle mass sensors, drift over time due to the sensor element collecting dust. Most of the air quality sensors available in the market today may need to be cleaned periodically to maintain their accuracy over time. When these sensor units are not cleaned, the drift over time becomes too high, and the reading by the dust covered sensor becomes unusable. This type of drift and clean and then recalibration cycle can be taken into account much easily when the single air quality sensor (e.g., 169) is involved. This also eliminates the need to cross calibrate with the mating sensor (calibrated due to variables sensor to sensor as to make the data collected reliable and usable) to ensure data accuracy.

The sensor system 151 with the single air quality sensor 169 is also configured to reduce the drift in a lower cost particle mass sensor to a point in which the reduced drift can be taken into consideration and compensated for by the air purifying system's controller firmware. The clean air (i.e., air that has already passed through the air filters of the air purifying system 104) will be introduced into the same particle mass sensor that is used for non-filtered air. By switching back and forth from pre-filtered and post filtered air, the particle mass sensor is cleaned to the point that the drift over time of the sensor is slowed as to be within an acceptable deviation parameter.

In one embodiment, an air quality sensor is just placed on the outlet flow side of the air purifying system 104 (i.e., without placing an air quality sensor on the air intake side). This configuration allows the controller 106 to determine if the filters of the air purifying system 104 are performing within an established performance parameter range. For example, the controller 106 is configured to compare the outlet air quality data from the outlet air quality sensor 207 to the expected performance criteria of the filtration media installed to determine if the air purifying system 104 is performing as specified.

The sensing device 108 is configured to detect certain performance parameters such as the quality of the air around the air purifying system 104, the quality of air coming out of the air purifying system 104, etc. These detected performance parameters may then be used to determine what elements are being purified by the air purifying system 104.

In one embodiment, the air purifying system 104 may include two particle sensors. One particle sensor is disposed at the airflow inlet 22 of the air purifying system 104 to measure an air quality parameter of the air entering the housing 126 via the air inlet 122 to generate inlet air quality data and the other particle sensor is disposed the airflow outlet 24 of the air purifying system 104 to measure an air quality parameter of the air exiting the housing via the air outlet to generate outlet air quality data.

In one embodiment, a plurality of sensors even of the same type may be placed into different locations within the same air purifying system 104 allows the air purifying system 104 to establish and compare sampled sensor readings against an established criterion to determine and control the air purifying device's 104 functionality parameters. Referring to FIG. 1, two air quality sensors are placed at different locations within a single air purifying system 104.

Since the use of multiple sensors may become limiting due to cost constraints and difficulty establishing a common set point for comparison readings, in one embodiment, the air purifying system 104 may include a sensor system 151 that has a single air quality sensor 169. The single air quality sensor 169 is used to measure and compare air quality levels from differing regions and/or airflow streams within the air purifying system 104. That is, this single air quality sensor 169 has the ability to sample from differing regions and/or airflow streams as will be explained in detail below with respect to FIGS. 7 and 8.

Referring to FIGS. 7 and 8, the air purifying system 104 includes a sensor system 151. The sensor system 151 is disposed in the housing 126 of the air purifying system 104. The sensor system 151 includes a sensor housing 153 having a first air inlet opening 155 in fluid communication with a first portion 157 (e.g., as shown in FIG. 9) of the airflow path 163, a second air inlet opening 159 in fluid communication a second portion 161 of the airflow path 163, and a suction opening 165.

The housing 153 of the sensor system 151 includes two air source inlets. It is contemplated that the housing 153 of the sensor system 151 may be configured to sample air from a plurality of locations of the air purifying system 104 by having a plurality of openings thereon which align (one at a time) with an inlet opening of a flow directing member 167.

The housing 153 of the sensor system 151 has a circular shaped configuration as shown in FIGS. 7 and 8. It is contemplated that the housing 153 of the sensor system 151 may include other shapes, sizes and configurations. In its broadest sense, the housing 153 of the sensor system 151 may include any encasement of the sensor including a mechanical alternating air chamber means to sample air from a plurality of locations of the air purifying system 104. The alternating means may be activated manually, automatically, by motorized, pneumatic, solenoid actuation or any other similar actuating means which move/rotate the flow directing member 167.

The sensor system 151 also includes the flow directing/routing member 167 disposed in the sensor housing 153 and configured to be moved between a first position (as shown in FIG. 7) in which the flow directing member 167 allows the air from the first portion 157 of the airflow path 163 to enter the sensor housing 153 via the first air inlet opening 155 and a second position (as shown in FIG. 7) in which the flow routing member 167 allows the air from the second portion 161 of the airflow path 163 to enter the sensor housing 153 via the second air inlet opening 159. FIG. 7 shows the sensor system 151 in the flow directing member 167 is in its first position, while FIG. 8 shows the sensor system 151 in which the flow directing member 167 is in its second position.

The sensor system 151 also includes the sensor device 169 disposed in the sensor housing 153 and configured to measure an air quality parameter of the air entering the sensor housing 153. The fan 120 is configured to be in fluid communication with the suction opening 165 and configured to move the air entering the sensor housing 153 through the sensor device 169.

The air purifying system 104 may include one or more conduits that are configured to route or direct the air from the plurality of locations of the air purifying system 104 to the sensor system 151. For example, a simple hose assembly or designed enclosure could route the air from the desired location to the manifold assembly or sensor system 151.

The flow directing member 167 may be in the form of a rotating disk 171 with an inlet opening 173 and an outlet opening 175. In other embodiments, the flow directing member 167 may have other shapes, sizes and configurations that enable the sensor system 151 to sample air from multiple locations of the air purifying system 104 using the single air quality sensor 169. For example, the flow directing member 167 may include disk, pipe or tube, actuates a baffle, or any other means to direct or route air through an opening to the semi-enclosed sensor unit and then out again in an alternating or sequential means as to sample from a different source with each alternation or sequence.

The sensor system 151 may also include a drive assembly 171 that is configured to move the flow directing member 167 between its first position and its second position. For example, the drive assembly 171 may include a motor 173 and a reduction gear assembly 179 configured to rotate a drive axle 181. The flow directing member 167 is operatively connected to the drive axle 181. The drive axle 181 may in turn rotate the flow directing member 167.

When the flow directing member 167 is in the first position (as shown in FIG. 7), the inlet opening 173 of the flow directing member 167 is configured to align with the first air inlet opening 155 of the sensor housing 153 to allow the air from the first portion 157 of the airflow path 163 to enter the sensor housing 153 via the first air inlet opening 155. The air entering the sensor housing 153 through the aligned openings 173 and 155 is drawn into the air quality sensor 169.

The fan 120 is configured to be in fluid communication with the suction opening 165 and configured to move the air entering the sensor housing 153 through the sensor device 169. In another embodiment, the air may be drawn into the air quality sensor 169 by way of a small inlet fan which is a component of the sensor system 151. The exhausted air from the air quality sensor 169 is then routed and let out of the opening 165. The opening 165 is disposed close to the air quality sensor 169.

The first portion 157 of the airflow path 163 refers to the inlet portion of the airflow path 163. The first portion 157 of the airflow path 163 refers to a portion of the airflow path 163 that is disposed before the air filters.

Also, when the flow directing member 167 is in the first position, portions of the flow directing member 167 are configured to cover the second air inlet opening 159 of the sensor housing 153 to prevent the air from the second portion 161 of the airflow path 163 to enter the sensor housing 153 via the second air inlet opening 159.

When the flow directing member 167 is in the second position (as shown in FIG. 8), the inlet opening 173 of the flow directing member 167 is configured to align with the second air inlet opening 159 of the sensor housing 153 to allow the air from the second portion 161 of the airflow path 163 to enter the sensor housing 153 via the second air inlet opening 159. The air entering the sensor housing 153 through the aligned openings 173 and 159 is drawn into the air quality sensor 169.

The second portion 161 of the airflow path 163 refers to the outlet portion of the airflow path 163. The second portion 161 of the airflow path 163 refers to a portion of the airflow path 163 that is disposed after the air filters.

Also, when the flow directing member 167 is in the second position, portions of the flow directing member 167 are configured to cover the first air inlet opening 155 of the sensor housing 153 to prevent the air from the first portion 157 of the airflow path 163 to enter the sensor housing 153 via the first air inlet opening 155.

The flow directing member 167, when in the first position, accommodates a first source of incoming air for the sensor 169 to sample. The flow directing member 167, when in the second position, accommodates a second source of incoming air for the sensor 169 to sample. The first source of air is different from the second source of air. That is, the flow directing member 167 aligns with different openings of the sensor housing to allow air from different sources to enter into the sensor 169.

The sensor system 151 may be referred to as an alternating air manifold. For ease of demonstrating the advantageous of this type of alternating air source manifold, FIG. 1 shows two air quality sensors located in two different locations (one in the inlet air stream and the other in the outlet air stream) of the air purifying system 104. As a variation to FIG. 1, the sensor system 151 in FIGS. 7 and 8 replaces both inlet and outlet air quality sensors of FIG. 1. The inbound air is sampled by the sensor 169 when the flow directing member 167 is in the first position as shown in FIG. 7. The outbound air is sampled by the same sensor 169 when the flow directing member 167 is in the second position as shown in FIG. 8.

Figure 10:
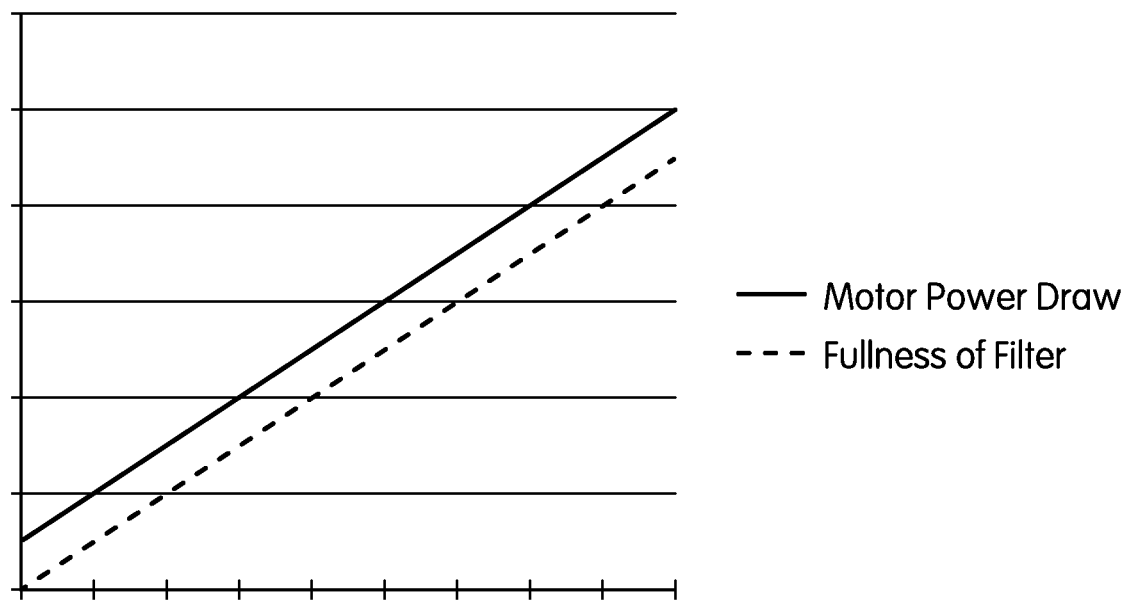
FIG. 10 is a graph illustrating a correlation of the power drawn by a motor of the air purifying system as the air purifying filter of the air purifying system is filled with entrapped particles over time and as the controller of the motor strives to keep the motor RPM constant in accordance with an embodiment of the present patent application.

FIG. 10 is a graph illustrating the correlation of the power drawn by the motor as the air filter fills with entrapped particles over time (or the lift of the air filter) as the motor controller strives to keep the motor RPM constant. When the air filter is new, missing or is a high flow non-HEPA type of air filter, this create lesser load (power drawn) on the motor at a given or constant RPM or when there is an abnormal volume of bypass air going around the air filter. A reduced airflow situation occurs when the air filter starts to fill up with entrapped particles and less air passes through the air filter as the air filter fills up causing the motor load to spike (move upwards and draw more power) at a given or constant RPM.

Other control and performance assessments and actions for the air purifying system can be made to determine the air purifying system's effectiveness within a given environment by sampling, recording, and comparing the particle counter array's (air quality sensors) outputs while taking into considering the other sensors (including, but not limited to, motion sensor, a light sensor, a laser sensor, a radiation sensor, a temperature sensor, an audio sensor, a proximity sensor, an Infrared (IR) beam sensor, a motor speed sensor, a motor current sensor, etc.) which are in communication with the air purifying system over a given time span as to allow the controller(s) of the air purifying system or multiple such air purifying systems to adjust per a chosen operational setting or settings.

The controller may then allow the air purifying system or a multitude of such air purifying systems to react, signal, communicate, or automatically respond to the received signals from the sensor/s of the air purifying system or the greater collective of the air purifying system and their corresponding sensors depending on the predetermined conditions programmed into the controller or controllers of the stated air purifying system or air purifying system or other such similar systems.

This additional capability not only allows a single air purifying system to determine its optimal performance parameters, but also allows the single air purifying system to function within a plurality of air purifying systems to determine how each single air purifying system should be set, function, re-set and/or adjust itself as part of a collective of such similar air purifying systems or in a group/collection/array of intelligently controlled dissimilar systems (for example, but not limited to Smart Fans, Smart Vents, Humidifiers, Dehumidifiers, Air Conditioners as well as Air Purifiers) as to facilitate their functionality in a complementarily way towards a set of pre-programmed objectives.

The air purifying system 104 may include one or more communication devices coupled to its controller 106 for establishing communication between the controllers of the other air purifying systems 104. The one or more the communication devices may include a receiver for receiving information or signals from one or more controllers of the other air purifying systems 104 and a transmitter for transmitting the information or signals to one or more controllers of the other air purifying systems 104. The receivers and the transmitters of the air purifying systems 104 are configured to establish a communication link or communication network between one or more controllers of the air purifying systems 104 prior to the transmission of information or signals. The communication network may include any communication network such as the telephone network, wide area network, local area network, Internet or wireless communication network. Examples of wireless communications may include Bluetooth, RF, Wi-Fi, infrared, ultrasonic, or any other wireless connection.

The air purifying system 104 is generally configured to purify air in spaces or targeted zones having an area from about 79 square feet to about 620 square feet. In one embodiment, the dual air channel unit air purifier is generally configured to purify air in spaces or targeted zones having an area of about 620 square feet. In one embodiment, the single air channel unit air purifier is generally configured to purify air in spaces or targeted zones having an area of about 310 square feet.

The air purifying system 104 is generally configured to provide purified air at a Clean Air Delivery Rate (CADR) ranging from about 68 CADR to about 450 CADR. In one embodiment, the air purifying system 104 is generally configured to provide purified air at 440 CADR. In another embodiment, the air purifying system 104 is generally configured to provide purified air at 220 CADR. The air purifying system 104 is generally configured to provide airflow rate ranging from about 50 Cubic Feet per Minute (CFM) to about 440 CFM. In one embodiment, the air purifying system 104 is generally configured to provide airflow rate at 430 CFM. In another embodiment, the air purifying system 104 is generally configured to provide airflow rate at 210 CFM.

The air purifying system 104 is generally has noise levels ranging from about 39 decibels (dB) to about 45 dB, when the fan is running on a low speed and from about 60 dB to about 74 dB, when the fan is running on a high speed. In one embodiment, the air purifying system 104 is generally has noise level of about 39 dB, when the fan is running on a low speed and of about 64 dB, when the fan is running on a high speed. In another embodiment, the air purifying system 104 is generally has noise level of about 49 dB, when the fan is running on a low speed and of about 74 dB, when the fan is running on a high speed.

The air purifying system 104 may include a modular design in which separated airflows, motors and filters (powered and non-powered) may be incorporated into a single air purifier system housing in a modular fashion so as to work independently and in tandem with each other by an intelligent controller/control means in response to the air purifying system's sensor inputs. It is contemplated that, in accordance with the embodiments of the present patent application, the air purifying system 104 may include the air purifying sub-units to be in a side by side configuration, or in a layered or overlapping configuration. The two or more independent airflow channels may include any type of filtering media and/or purifying components and are operated by a single controller within the air purifying system 104. Each air purifier sub-unit may have a motor, a fan and an airflow channel, and wherein each airflow channel is configured to receive different types of air filtering media, different types of air purifying components, or different types of air filtering media and air purifying components to specifically target particular matter a user desires to filter.

The air purifying system 104 may be part of an air purifying system that includes a plurality (one or more) of such air purifiers, where each air purifying system 104 includes the controller 106 and the sensing device 108. Each of the plurality of the air purifying systems 104 include one or more communication devices coupled to the controller thereof for establishing communication between the controllers of the air purifying systems 104 of the air purifying system. The number of air purifying systems 104 in the air purifying system can vary significantly in number based on the requirements of the user. Also, the positioning of the air purifying devices 104 of the air purifying system may vary. The air purifying systems 104 may generally be spaced-apart from one another by a predetermined distance such that each air purifying system 104 is configured to purify air in a designated area within the targeted zone. Such designated areas may or may not overlap with each other. The designated areas may generally surround their respective air purifier. The air purifying system s may also be randomly spaced.

The air purifying system 104 is designed to be easily serviced by a user, a customer or a field technician. For example, a cover or filter door of the housing 126 of the air purifying system 104 may be configured to open so as to provide easy access to the filter element(s). The cover or filter door may be secured in the closed position, by at least one latch. The air purifying system 104 may also be operatively connected to a separate computer device or system, by a wired and a wireless communication, so as to notify and communicate the user when service or maintenance is needed by the air purifying system 104.

The air purifying system 104 is configured to operate in at least one of a plurality of modes of operation. The plurality of modes of operation of the air purifying system 104 may include a high performance mode, a quiet mode, and a power-off/sleep mode. The different modes of operation of the air purifying system 104 may be invoked adaptively based upon a signal generated by the sensing device 108. The different modes of operation of the air purifier 104 may be invoked manually by the user via the user interface 113. In the high performance mode, the air purifying system 104 is programed to run the fan 120 at a high speed so as to deliver highest purified air output (with the highest CFM output). The fan 120 may be run at one or more different high speeds when the air purifying system 104 is in the high performance mode. The quiet or low CFM mode may have a reduced audible noise and has a lower airflow or purified CFM air output in comparison with the higher performance mode. The fan 120 may be run at one or more different low speeds when the air purifier is in the quiet mode. The quiet mode may be a power saving mode of the air purifying system 104. The power-off/sleep mode may be configured to deactivate the air purifying system 104. The fan 120 and motor assembly may stop operating in the power-off/sleep mode. The power-off/sleep mode may be used during servicing or maintenance of the air purifying system 104. The air purifying system 104 may also include a plasma operation, a normal/public space operation and a meeting room/quiet operation.

The air purifying system 104 also includes a built-in power supply 502 (as shown in FIG. 1) that is configured to power a modular powered filter unit (such as an electrostatic filter) or an alternative purifying component or assembly such as a UV lamp or UV photo-catalytic unit. That is, the built-in power supply of the air purifying system 104 allows for the use of powered filter media and powered purifying assembly or components. The air purifying system 104 also includes a safety interlock switch that cuts power to the built-in power supply.

The controller 106 of the air purifying system 104 may be configured to receive the sensor inputs and to determine the motor speed, the air purifier system's noise, the filter usage, the airflow and the servicing needs. The controller 106, based on the sensor inputs, may be also configured to control the motor speed and the purified air output/CFM throughput to achieve desired noise and performance levels.

The air purifying system with intelligent sensors and airflow described in the present patent application discloses all the benefits of an air purification system having a plurality of air purifying systems 104 each having a controller and a sensing device (and/or a multitude of sensing devices). For example, such an air purification system (with a plurality of air purifying systems) is described in detail in U.S. patent Ser. No. 14/262,111, which is now granted as U.S. Pat. No. 9,737,842 and which is incorporated into the present patent application by reference in its entirety. The present patent application also discloses the benefits of an air purifying system having multiple air purification channels within a single air purifying system with a controller and a sensing device (and/or a multitude of sensing devices). For example, such an air purifying air purifying with multiple air purification channels described in detail in U.S. patent Ser. No. 14/262,111, which is now granted as U.S. Pat. No. 9,737,842 and which is incorporated into the present patent application by reference in its entirety.

Figure 13:
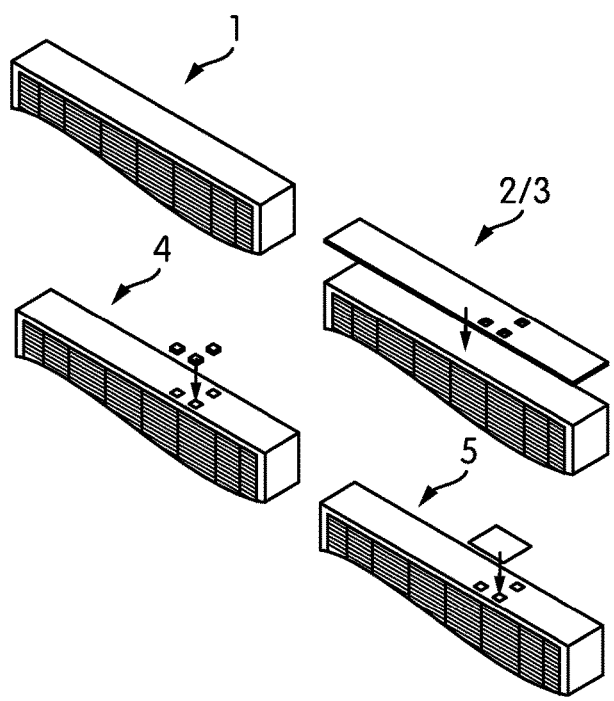
FIG. 13 shows various exemplary recognizable configurations used to detect type of air filtering component used in the air purifier in accordance with an embodiment of the present patent application.
Figure 13:
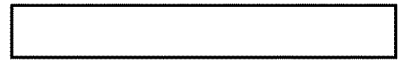
Figure 13:
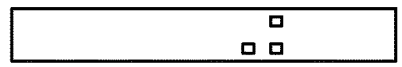
Figure 13:
Figure 13:
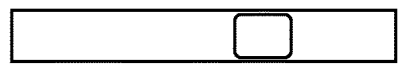

Referring to FIG. 13, in one embodiment, an air purifying device is provided. The air purifying device comprises an air purifier mechanism, a controller and a sensor. The air purifier mechanism is received in a housing. The housing provides an air flow path between an air inlet configured to receive ambient air and an air outlet configured to deliver purified air. The air purifier mechanism includes an air purifying system, a fan and a drive mechanism.

The air purifying system is disposed in the air flow path and is configured to remove contaminants present in the ambient air passing through the housing. The drive mechanism is configured to drive the fan at variable speeds to move the air through the air flow path between the air inlet and air outlet. The controller has a plurality of predetermined operational settings to govern operation of the air purifier mechanism. The controller comprises one or more processors and is configured to receive an input to select one of the predetermined operational settings to govern the operation of the air purifier mechanism. The air purifier mechanism is configured to operate in at least one of a plurality of modes of operation for each of the air purifier mechanism's predetermined operational settings. The air purifying system is configured to removably receive at least one of a plurality of different types of air purifying components. The sensor is configured to detect the type of air purifying component received in the air purifying system from among the plurality thereof. The controller is configured to select the mode of operation from the plurality of modes of operation of the air purifier mechanism in response to the detected type of air purifying component detected by the sensor. In one embodiment, the air purifying component includes an air filter.

In one embodiment, the sensor is a magnetically actuated sensor that is configured to sense magnetic material embedded within each of the different types of air purifying components. In one embodiment, the magnetic material being different for each type of air purifying component to enable the sensor to discriminate among the different types.

In one embodiment, a component or a frame used to hold each different type of air purifying component includes one or more magnets disposed in a designated position and/or in a designated pattern on the surface of the frame. In one embodiment, the sensor is configured to sense the one or more magnets to determine the type of the air purifying component that has been received.

In one embodiment, referring to FIG. 13, the air purifying system 104 is configured to sense the presence of the filtering media and purifying component. This allows the controller 106 to determine the optimal operating conditions at any given time by taking into account the various commands and sensor readings. The air purifying system 104 is configured to determine the type of filtering media and/or air purifying component that has been inserted (e.g., Carbon, HEPA, combination-powered electrostatic etc.) into the air purifying system 104. For example, reed switches embedded in the air purifying system 104 and magnets placed on the filtering components are used to provide a multitude of recognizable configurations to detect the type of filtering media that has been inserted into the air purifier. The reed switches are generally mounted on a Printed Circuit Board (PCB) and assembled into the air purifier unit and the magnets are generally assembled (e.g., by the manufacturer) into the frame of the filters. For example, a HEPA filter may have a magnet placed in a certain location of its frame assembly, while the carbon filter may have a magnet placed in another/different location of its frame assembly. The air purifier unit is configured to determine the type of filter that has been installed. This determination is based on the reed switches of the air purifier unit that have been activated by the magnet(s) on the filter frame assembly. A "code" that includes a combination of the number of magnets and their respective placement on the filter frame assembly may also be used to determine the type of filter that has been installed in the air purifier unit.

In one embodiment, a hall or magnetically actuated sensor/switch embedded in the air purifying system 104 and one or more metallic material elements (i.e., instead of magnets) placed on the filtering components are used to provide a multitude of recognizable configurations to detect the type of filtering media that has been inserted into the air purifier. The air purifier unit is configured to determine the type of filter that has been installed. This determination is based on the hall or magnetically actuated sensor/switch of the air purifier unit that have been activated by the one or more metallic material elements on the filter frame assembly. A "code" that includes a combination of the number of metallic material elements and their respective placement on the filter frame assembly may also be used to determine the type of filter that has been installed in the air purifier unit.

In one embodiment, a sensor in the air purifying system 104 and one or more radio frequency identification (RFID) or optical barcode (i.e., instead of magnets) placed on the filtering components are used to provide a multitude of recognizable configurations to detect the type of filtering media that has been inserted into the air purifier. The air purifier unit is configured to determine the type of filter that has been installed. This determination is based on the sensor of the air purifier unit that have been activated by the RFID or the optical barcode on the filter frame assembly.

The air purifying system is configured to utilized a multitude of sensors with the capability of analyzing the air surrounding, flowing through, and exiting the air purifying system and the air purifying system (with a plurality of air purifying systems). With the sensor(s) disclosed in the present patent application sampling the airflow into, throughout, and exiting the air purifying system, certain additional performance parameters can be detected and observed by the air purifying system to determine the air purifying system's effectiveness within a given environment. The controller of the air purifying system takes into consideration the received sensor readings when actuating the air purifying system to react, signal, communicate, and automatically respond to the received signals depending on the predetermined conditions programmed into the air purifying system and/or a virtual digital machine residing in "the cloud" or a remote server in communication with the air purifying system or a plurality of air purifying systems.

The illustration of the embodiments of the present patent application should not be taken as restrictive in any way since a myriad of configurations and methods utilizing the present patent application can be realized from what has been revealed in the present patent application. The systems, features and embodiments described in the present patent application should not be considered as limiting in any way and it will be obvious from the present patent application how the sensor arrangement for the air purifying system with filters and the described features can be re-configured to enhance nearly any air handling and purification system that is designed to move and transform the characteristics of air within interior of a building or home. The embodiment of the present patent application should not be limiting, these mechanisms and features can be applied to consumer and commercial machine configurations, and can also be applied to nearly any filtration system or machine. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form.

The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. An air purifying system comprising:
a housing;
an air purifier mechanism received in the housing, the housing providing an airflow path between an air inlet configured to receive ambient air and an air outlet configured to deliver purified air;
wherein the air purifier mechanism includes an air purifying sub-system, a fan and a drive mechanism, wherein the air purifying sub-system is disposed in the airflow path between the air inlet and the air outlet and is configured to remove contaminants present in the ambient air passing through the housing, wherein the drive mechanism includes a motor and is configured to drive the fan to move the air through the airflow path between the air inlet and the air outlet;
wherein the airflow path includes an exit airflow path between the air purifying sub-system and the air outlet delivering the purified air;
a sensor disposed in or on the housing that contains the air purifier mechanism of the air purifying system, the sensor is configured to measure an air quality parameter of the air entering the housing via the air inlet to generate inlet air quality data, and to measure an air quality parameter of the purified air exiting the housing via the exit airflow path and the air outlet to generate outlet air quality data; and
a controller having one or more processors and operatively connected to the sensor and the air purifier mechanism, the controller being configured to:
receive the inlet air quality data and the outlet air quality data,
compare the inlet air quality data and the outlet air quality data with their corresponding predetermined threshold ranges,
determine an action to be taken based on the comparison, and
perform the determined action, wherein said determined action includes controlling an operating speed of the motor so as to control airflow rate of the purified air exiting the housing via the exit airflow path;
wherein the airflow path includes an entry airflow path between the air inlet through which the air enters the housing and the air purifying sub-system;
further comprising a sensor housing having the sensor disposed therein, a first air inlet opening in fluid communication with the entry airflow path, a second air inlet opening in fluid communication with the exit airflow path, and a suction opening; and
further comprising a flow director member disposed in the sensor housing and configured to be moved between a first position in which the flow director member allows the air from the entry airflow path to enter the sensor housing via the first air inlet opening so that the sensor in the sensor housing measures the air quality parameter of the air entering the housing via the entry airflow path and the air inlet to generate the inlet air quality data, and a second position in which the flow director member allows the air from the exit airflow path to enter the sensor housing via the second air inlet opening so that the sensor in the sensor housing measures the air quality parameter of the purified air exiting the housing via the exit airflow path and the air outlet to generate the outlet air quality data.

2. The air purifying system of claim 1, wherein the fan is configured to be in fluid communication with the suction opening and configured to move the air entering the sensor housing through the sensor.

3. The air purifying system of claim 2, wherein the sensor is configured to sample air from multiple locations of the air purifying system.

4. The air purifying system of claim 3, wherein the air purifying system is configured to removably receive at least one of a plurality of different types of air purifying components, further comprising an air purifying component detection sensor is configured to detect the type of air purifying component received in the air purifying system from among the plurality thereof, and wherein the controller is configured to determine the predetermined threshold ranges corresponding to the inlet air quality data and the outlet air quality data from a plurality of predetermined threshold ranges in response to the detected type of air purifying component detected by the air purifying component detection sensor.

5. The air purifying system of claim 4, wherein the air purifying component includes an air filter.

6. The air purifying system of claim 4, wherein the air purifying component detection sensor is a magnetically actuated sensor that is configured to sense magnetic material embedded within each of the plurality of the different types of air purifying components, and wherein the magnetic material is different for each type of air purifying component to enable the sensor to discriminate among the plurality of different types of air purifying components.

7. The air purifying system of claim 1, wherein the sensor is configured to switch back and forth between detecting pre-filtered air and detecting post filtered air so as to reduce the drift of the sensor over time, wherein the pre-filtered air includes the air entering the housing of the air purifier mechanism via the entry airflow path and the air inlet, and wherein the post filtered air includes the purified air exiting the housing of the air purifier mechanism via the exit airflow path and the air outlet.

8. The air purifying system of claim 4, further comprising a frame used to hold each different type of air purifying component includes one or more magnets disposed in a designated position and/or in a designated pattern therein, wherein the air purifying component detection sensor is a magnetically actuated sensor that is configured to sense the one or more magnets to determine the type of the air purifying component that has been received.

9. The air purifying system of claim 4, further comprising reed switches embedded in the air purifying system, wherein the reed switches embedded in the air purifying system and the one or more magnets are used to provide a Multitude of recognizable configurations to detect the type of air purifying component that has been inserted into the air purifier system.

10. The air purifying system of claim 4, wherein the air purifying component detection sensor is a magnetically actuated sensor array that is configured to sense a pattern of magnets embedded in a frame of each of the plurality of the different types of air purifying components, and wherein the pattern of magnets is different for each type of air purifying component to enable the sensor array to discriminate among the plurality of different types of air purifying components.

* * * * *